US012769677B2

(12) United States Patent
Singh et al.

(10) Patent No.: US 12,769,677 B2
(45) Date of Patent: Oct. 20, 2026

(54) MEMORY ARCHITECTURE

(71) Applicant: NVIDIA Corporation, Santa Clara, CA (US)

(72) Inventors: Ravi Pratap Singh, Austin, TX (US); Sreenivas Krishnan, Campbell, CA (US); Ching-Yu Hung, Pleasanton, CA (US); Jagadeesh Sankaran, Dublin, CA (US); Yen-Te Shih, Zhubei City (TW); Andrew Peter Taussig, Scottsdale, AZ (US)

(73) Assignee: NVIDIA Corporation, Santa Clara, CA (US)

( * ) Notice: Subject to any disclaimer, the term of this patent is extended or adjusted under 35 U.S.C. 154(b) by 189 days.

(21) Appl. No.: 18/789,896

(22) Filed: Jul. 31, 2024

(65) Prior Publication Data

US 2026/0037457 A1 Feb. 5, 2026

(51) Int. Cl.
*G06F 13/16* (2006.01)
*G06F 9/30* (2018.01)

(52) U.S. Cl.
CPC ...... *G06F 13/1689* (2013.01); *G06F 9/30043* (2013.01); *G06F 13/1673* (2013.01)

(58) Field of Classification Search
CPC ............. G06F 9/30043; G06F 13/1673; G06F 13/1689
USPC .......................................................... 711/154
See application file for complete search history.

(56) References Cited

U.S. PATENT DOCUMENTS

| | | | | |
|---|---|---|---|---|
| 7,664,907 | B1 * | 2/2010 | Hutsell | G06F 13/1626 711/E12.001 |
| 7,836,229 | B1 * | 11/2010 | Singh | G06F 9/5016 710/52 |
| 10,534,736 | B1 * | 1/2020 | Reghunath | G09G 5/026 |
| 11,573,795 | B1 | 2/2023 | Itani et al. | |
| 11,573,921 | B1 | 2/2023 | Itani et al. | |
| 11,593,001 | B1 | 2/2023 | Hung et al. | |
| 11,593,290 | B1 | 2/2023 | Itani et al. | |
| 11,704,067 | B2 | 7/2023 | Hung et al. | |
| 11,836,527 | B2 | 12/2023 | Singh et al. | |
| 11,940,947 | B2 | 3/2024 | Hung et al. | |
| 11,954,496 | B2 | 4/2024 | Hung et al. | |

(Continued)

FOREIGN PATENT DOCUMENTS

WO WO-2013149045 A1 * 10/2013 ............. G06F 13/00

*Primary Examiner* — Reginald G Bragdon
*Assistant Examiner* — Aaron D Ho
(74) *Attorney, Agent, or Firm* — Foley & Lardner LLP

(57) ABSTRACT

Aspects of this technical solution can provide at least a technical improvement to reading and writing data between a memory device and a processor, including, for example, by providing a technical solution to configure one or more load streams with stream sizes configured based on relative speed of a processor and a memory. For example, this technical solution can provide a technical improvement to processing speed of computations by a processor with data obtained from or stored to a memory device. For example, a system in accordance with this technical solution can provide a decoupled load store unit (DLSU) distinct from a processor and a memory device to prefetch a sufficient amount of data from a memory device into a stream buffer of a DLSU, to provide instructions to a processor at a rate that eliminates waiting by the processor for memory over one or more cycles.

20 Claims, 13 Drawing Sheets

200

(56) References Cited

U.S. PATENT DOCUMENTS

| | | | | |
|---|---|---|---|---|
| 12,099,439 | B2 | 9/2024 | Hung et al. | |
| 12,118,353 | B2 | 10/2024 | Hung et al. | |
| 2013/0262809 | A1 * | 10/2013 | Wegener | H03M 7/24 711/E12.002 |
| 2019/0034239 | A1 * | 1/2019 | Cai | G06F 12/1027 |
| 2019/0377683 | A1 * | 12/2019 | Polychroniou | G06F 12/0897 |
| 2020/0110639 | A1 * | 4/2020 | Corsi | G06F 9/3004 |
| 2022/0100665 | A1 * | 3/2022 | Kotra | G06F 12/0862 |
| 2023/0042858 | A1 | 2/2023 | Singh et al. | |
| 2023/0050062 | A1 | 2/2023 | Hung et al. | |

* cited by examiner

500

MEMORY ARCHITECTURE

TECHNICAL FIELD

The present implementations relate generally to microprocessor devices, including but not limited to load and store memory architectures.

INTRODUCTION

Computational processors are expected to handle increasingly complex datasets with improved computational efficiency. However, conventional processing systems can have significant differences in processing speed and data transfer speed, resulting in mismatches between processing components that can reduce overall system performance and reduce or eliminate the ability to conduct various types of computational processes outright (e.g., image processing or graphics processing).

SUMMARY

Approaches in accordance with various embodiments can provide at least a technical improvement to reading and writing data between a memory device and a processor, including, for example, by providing a technical solution to configure one or more load streams with stream sizes configured based on relative speed of a processor and a memory. For example, this technical solution can provide a technical improvement to processing speed of computations by a processor with data obtained from or stored to a memory device. For example, a system in accordance with this technical solution can provide a decoupled load store unit (DLSU) distinct from a processor and a memory device to prefetch a sufficient amount of data from a memory device into a stream buffer of a DLSU, to provide data to a processor at a rate that eliminates waiting by the processor for memory over one or more cycles. Thus, a technical solution for a load and store memory architecture is provided.

At least one aspect is directed to a system. The system can include a memory device. The system can include a first processor including a stream processor and a scheduling processor, the first processor coupled with the memory device. The system can include a second processor coupled with the first processor. The system can include one or more processors. The system can configure, according to a first latency of the memory device, the stream processor to provide data with the memory device at the first latency. The system can configure, according to a second latency of the second processor, the scheduling processor to provide the data with one or more memory registers of the second processor at the second latency. The system can provide the data between the first processor and the memory device at the first latency. The system can provide the data between the second processor and the stream processor at the second latency.

At least one aspect is directed to a method. The method can include configuring, according to a first latency of a memory device, a stream processor of a first processor, the stream processor configured to provide data with the memory device at the first latency. The method can include configuring, according to a second latency of a second processor, a scheduling processor of the first processor, the scheduling processor configured to provide the data with one or more memory registers of the second processor at the second latency. The method can include providing the data between the first processor and the memory device at the first latency. The method can include providing the data between the second processor and the stream processor at the second latency.

At least one aspect is directed to a system-on-a-chip (SoC) and can include at least one graphics processing unit (GPU) providing multi-core parallel processing via a plurality of respective lanes. The GPU can configure, according to a first latency of a memory device, a stream processor of a first processor, the stream processor configured to provide data with the memory device at the first latency. The GPU can configure, according to a second latency of a second processor, a scheduling processor of the first processor, the scheduling processor configured to provide the data with one or more memory registers of the second processor at the second latency. The GPU can provide the data between the first processor and the memory device at the first latency. The GPU can provide the data between the second processor and the stream processor at the second latency.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

Figure 1:
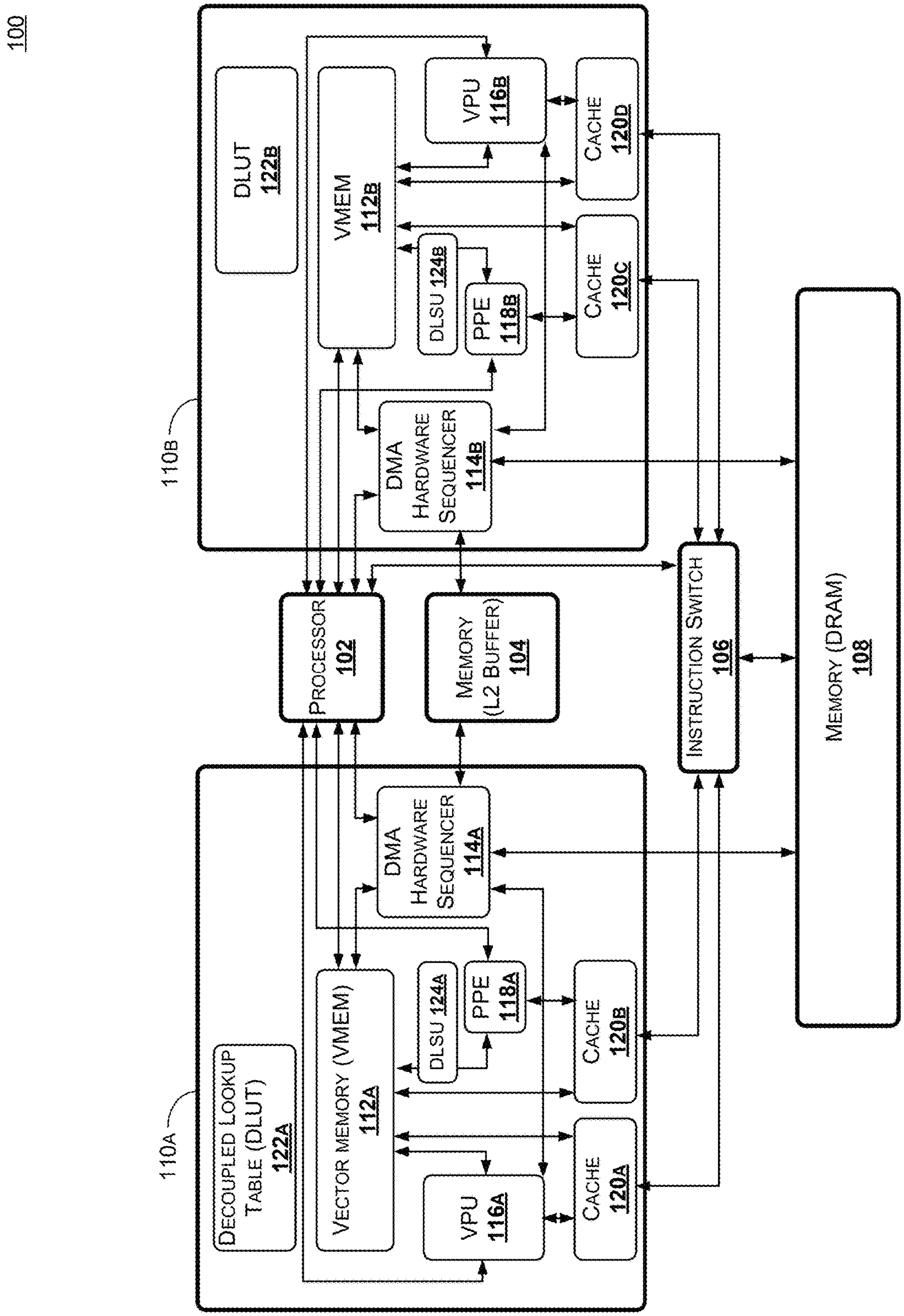
FIG. 1 depicts an example computing environment in which one or more devices operate to process data using an SoC, in accordance with some embodiments of the present disclosure.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

To reduce execution time (improved performance), the number of vector elements processed in a single operation can be increased leading to an increase in the width of the single instruction multiple data (SIMD) datapath. The width of the register file width can grow accordingly. However, due to physical implementation constraints or architectural tradeoff, the width of the data memory may not be able to scale with the SIMD. As such, having to size the SIMD width to match the memory throughput is a major challenge to improve performance of applications that have higher levels of data parallelism. This challenge is further exacerbated for processors like the Pixel Processing Engine (PPE) from NVIDIA where the processing engines (PEs) are organized in a two-dimensional (2D) SIMD leading to a much higher mismatch between SIMD vector compute and Data Memory.

For optimal scheduling and efficiency, compilers prefer fixed and low latency for the SIMD as well as data memory operations. Processors attempt to solve the data memory problem for compilers by implementing small Level 1 data caches with a fixed low latency for hits. But in the event of a data cache miss, the processor stalls leading to significant loss in performance, especially for applications that have limited spatial or temporal locality. If a larger capacity data memory is needed, it comes at the expense of substantially increased latency. However, increasing the pipeline depth needed to match the latency for the memory, or including additional random access memory near processers, causes the expense of increased cost (e.g., package or device area and power consumption).

In an aspect, this technical solution can include a compiler view, which sees the load/store operations as fixed minimum latency, while handling the longer latency to access a large shared (with other processors) data memory. In an aspect, this technical solution can decouple memory accesses from a processor pipeline, so that both can be performed in the background to minimize stalls, while ensuring memory ordering and interlocking on true dependencies. In an aspect, this technical solution can interface between a 2D SIMD datapath and an existing large, shared data memory, whose width can be an order of magnitude smaller than the PE array.

Aspects of this technical solution relate to systems, methods, and non-transitory computer-readable media for a memory device with a multidimensional stream buffer to prefetch data from a memory device to reduce or eliminate processing delays that can reach many cycles (e.g., 25 cycles or more) to prevent a processor from stopping during processing of pixel data. For example, a system according to this disclosure can include a decoupled load store unit (DLSU) that is distinct from and couples a memory device (e.g., a vector memory or VMEM) and a processor including a pixel processing engine (PPE). The DLSU can include a stream buffer configured according to one or more properties of the hardware of the PPE or one or more properties of the hardware of the VMEM. For example, the DLSU can include a plurality of load streams each including a respective buffer (e.g., a first in first out (FIFO) queue). One or more parameters of the DLSU and each load stream may be set according to one or more parameters determined by a compiler configured to generate machine code (e.g., assembly) for the DLSU corresponding to the one or more properties of the hardware of the PPE or the one or more properties of the hardware of the VMEM, to optimize loading of instruction to the PPE from the VMEM via the DLSU, and to optimize storing of instructions from the PPE to the VMEM via the DLSU.

In an aspect, a system as discussed herein can include one or more processors that are comprised in at least one of a control system for an autonomous or semi-autonomous machine. In an aspect, a system as discussed herein can correspond to or include a perception system for an autonomous or semi-autonomous machine. In an aspect, a system as discussed herein can correspond to or include a system implemented using a robot. In an aspect, a system as discussed herein can correspond to or include an aerial system. In an aspect, a system as discussed herein can correspond to or include a medical system. In an aspect, a system as discussed herein can correspond to or include a boating system. In an aspect, a system as discussed herein can correspond to or include a smart area monitoring system. In an aspect, a system as discussed herein can correspond to or include a system for performing deep learning operations. In an aspect, a system as discussed herein can correspond to or include a system for performing simulation operations. In an aspect, a system as discussed herein can correspond to or include a system for generating or presenting virtual reality (VR) content, augmented reality (AR) content, or mixed reality (MR) content. In an aspect, a system as discussed herein can correspond to or include a system for performing digital twin operations. In an aspect, a system as discussed herein can correspond to or include a system for implementing one or more language models (e.g., large language models (LLMs), vision language models (VLMs), multi-modal language models, etc.). In an aspect, a system as discussed herein can correspond to or include a system implemented using an edge device. In an aspect, a system as discussed herein can correspond to or include a system incorporating one or more virtual machines (VMs). In an aspect, a system as discussed herein can correspond to or include a system for generating synthetic data.

In an aspect, a system as discussed herein can correspond to or include a system implemented at least partially in a data center. In an aspect, a system as discussed herein can correspond to or include a system for performing conversational artificial intelligence (AI) operations. In an aspect, a system as discussed herein can correspond to or include a system for performing generative AI operations. In an aspect, a system as discussed herein can correspond to or include a system implementing language models. In an aspect, a system as discussed herein can correspond to or include a system for implementing LLMs, VLMS, multi-modal language models, etc. In an aspect, a system as discussed herein can correspond to or include a system for hosting one or more real-time streaming applications. In an aspect, a system as discussed herein can correspond to or include a system for performing light transport simulation. In an aspect, a system as discussed herein can correspond to or include a system for performing collaborative content creation for 3D assets. In an aspect, a system as discussed herein can correspond to or include a system implemented at least partially using cloud computing resources. A system as discussed herein is not limited to the examples discussed above.

FIG. 1 is an example computing environment (referred to as environment 100) in which one or more devices operate to process data using an SoC, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle of FIGS. 10A-10D, example computing device of FIG. 8, and/or example data center of FIG. 9.

With reference to FIG. 1, the environment 100 can include processor 102, memory 104, instruction switch 106, memory 108 (sometimes referred to as dynamic random-access memory or DRAM), and functional blocks 110*a*, 110*b* (referred to individually as functional block 110 and collectively as functional blocks 110 unless otherwise specified). In some embodiments, the processor 102, memory 104, instruction switch 106, memory 108, and functional blocks 110 can interconnect (e.g., establish a connection to communicate and/or the like) via wired and/or wireless connections. In some embodiments, the components of the environment 100 can be included in a system on a chip (SoC). For example, the components of the environment 100 can be included in one or more SoCs that form integrated circuits by combining some or all of the component of the environment 100.

The processor 102 can include one or more processors such as one or more central processing units (CPUs), graphical processing units (GPUs), microprocessors, microcontrollers, and/or the like. The processor 102 can interconnect with an instruction cache (not explicitly shown) that stores instructions for the processor 102 to execute. In some embodiments, the processor 102 can be configured to output data associated with configuration and/or control of one or more of the devices of FIG. 1. For example, the processor 102 can be configured to output data associated with configuration of a direct memory access (DMA) hardware sequencer 114*a* and/or DMA hardware sequencer 114*b* to control DMA transfers to and/or from vector memory (VMEM) 112*a* and/or VMEM 112*b* of functional block 110*a* and functional block 110*b*, respectively.

The memory 104 (sometimes referred to as an L2 buffer or L2 cache) can include a storage device that is interconnected with the DMA hardware sequencer 114*a* and/or the DMA hardware sequencer 114*b* of the functional blocks 110. In some embodiments, the memory 104 can be configured to receive and store data from the DMA hardware sequencer 114*a* and/or the DMA hardware sequencer 114*b* of the functional blocks 110 as described herein. In some embodiments, the memory 104 can have one or more (e.g., 2) banks that enable simultaneous read or write requests. For example, the memory 104 can have a first bank that is associated with the DMA hardware sequencer 114*a* and a second bank that is associated with the DMA hardware sequencer 114*b*.

The instruction switch 106 can include one or more processors that are configured to scan the memory 108, receive data from the memory 108, cause data stored in the memory 108 and/or in local memory to the instruction switch 106 to be loaded into the VMEM 112, and/or the like. For example, the instruction switch 106 can be coupled to the memory 108 and/or include internal memory that has stored thereon instructions involved in operating one or more of the devices of the corresponding functional blocks 110. In an example, the instruction switch 106 can be configuring to obtain and provide data associated with instructions to perform one or more DMA transfers as described herein. In another example, the instruction switch 106 can be configured to obtain and provide data associated with instructions to perform one or more operations specific to one or more devices of the functional blocks 110. In an illustrative example, the instruction switch 106 can be configured to obtain and provide data associated with instructions to perform one or more filtering operations and the instruction switch 106 can transmit the data to caches 120 of corresponding functional units 110. In this illustrative example, the corresponding caches 120 can be configured to transmit (e.g., load) the data associated with the instructions into the VPU 116 or PPE 118 to cause the respective device to perform the one or more filtering operations.

The memory 108 can include a storage device that is interconnected with the DMA hardware sequencer 114*a* and/or the DMA hardware sequencer 114*b* of the functional blocks 110. In some embodiments, the memory 108 can receive and store sensor data generated by or using one or more sensors of a robot such as, for example, the example autonomous vehicle of FIGS. 10A-10D. For example, during operation of the robot or other autonomous or semi-autonomous machine, the memory 108 can be configured to receive data based at least in part on a direct interconnection with the one or more sensors or an indirect interconnection with the one or more sensors (e.g., via communication through a CAN bus and/or the like). In these examples, the sensor data can include image data associated with one or more images generated by one or more cameras, LiDAR data associated with one or more LiDAR data associated with one or more point clouds generated by one or more LiDAR sensors, radar data associated with one or more radar images generated by one or more radar sensors, and/or the like. In some embodiments, the memory 108 can be configured to provide (e.g., transmit) the sensor data stored therein to one or more components of the functional blocks 110. For example, during processing of the one or more images generated by or using the one or more cameras of the robot, the DMA hardware sequencer 114*a* and/or DMA hardware sequencer 114*b* can obtain the image data from the memory 108 and cause the image data to be stored in the VMEM 112*a* and/or VMEM 112*b*, respectively. In some embodiments, the memory 108 can receive and store data from the DMA hardware sequencer 114*a* and/or the DMA hardware sequencer 114*b* of the functional blocks 110. For example, the DMA hardware sequencer 114*a* and/or DMA hardware sequencer 114*b* can provide image data that was updated based at least in part on the processing of the image data to the memory 108 and the memory 108 can store the image data that was updated in the memory 108.

Functional blocks 110 can include VMEMs 112*a*, 112*b*, DMA hardware sequencers 114*a*, 114*b*, vector or vision processing units (VPUs) 116*a*, 116*b*, pixel processing engines (PPE) 118*a*, 118*b*, caches 120*a*, 120*b*, 120*c*, 120*d*, and decoupled lookup tables (DLUTs) 122*a*, 122*b*. For purposes of clarity, each will be referred to individually as VMEM 112, DMA hardware sequencer 114, VPU 116, PPE 118, cache 120, and DLUT 122, and collectively as VMEMs 112, DMA hardware sequencers 114, VPUs 116, PPEs 118, caches 120, and DLUTs 122 unless otherwise specified. While certain interconnections are illustrated, it will be understood that the connections illustrated are for simplicity and that one or more of the devices of the functional blocks 110 can interconnect with one or more other devices of the functional blocks 110 unless expressly stated otherwise.

The VMEMs 112 can include a storage device that is interconnected with the processor 102 and the respective DMA hardware sequencers 114, VPUs 116, PPEs 118, and caches 120 of the functional blocks 110. In some embodiments, the VMEMs 112 can receive and store the sensor data obtained from the memory 108. For example, the VMEMs 112 can receive and store the sensor data obtained from the memory 108 by the DMA hardware sequencers 114. Additionally, or alternatively, VMEMs 112 can receive and store the sensor data obtained from the memory 108 via the instruction switch 106. In some embodiments, the VMEMs 112 can interconnect with the PPEs 118 via decoupled load/store units (DLSUs) 124. As described herein, the DLSUs 124 can be configured to buffer data communicated between the VMEMs 112 and the PPEs 118 to reduce latencies associated with communication between the VMEMs 112 and the PPEs.

The DMA hardware sequencers 114 can include one or more processors that control the execution of one or more instructions. For example, the DMA hardware sequencers 114 can receive instructions from the processor 102, the respective VPUs 116 or PPEs 118, and/or a storage device (e.g., a device associated with the DMA hardware sequencers 114 such as internal or external memory, not explicitly shown) and the DMA hardware sequencers 114 can coordinate with the respective VPUs 116 and/or the PPEs 118 to perform one or more operations during execution of the instructions. In one illustrative example, the DMA hardware sequencers 114 can receive instructions that cause the DMA hardware sequencers 114 to obtain data (e.g., sensor data and/or the like) from the memory 108 and store the data in the respective VMEMs 112. In some embodiments, the DMA hardware sequencers 114 can perform one or more operations based at least in part on the data obtained from the memory 108. For example, the DMA hardware sequencers 114 can pad frames (e.g., image frames), manipulate addresses, manage overlapping data, manage different traversal orders, account for different frame sizes, and/or the like. In some embodiments, the DMA hardware sequencers 114 can receive signals (e.g., from the VPUs 116 or PPEs 118) indicating that one or more operations were performed on the data stored in the VMEMs 112, update one or more descriptors based at least in part on the updates to the data, and again perform operations on the data.

The VPUs 116 can include one or more processors that execute one or more instructions. For example, the VPUs 116 can receive instructions from the processor 102 and the respective VPUs 116 can coordinate with the DMA hardware sequencers 114 and/or PPEs 118 to perform the one or more operations during execution of the instructions. In one illustrative example, the VPUs 116 can receive instructions from the processor 102 that cause the VPUs 116 to trigger respective DMA hardware sequencers 114 to obtain sensor data from the memory 108 and store the sensor data in the respective VMEMs 112. In examples, the VPUs 116 can process the data stored in the respective VMEMs 112 and write data back to the VMEMs 112. In these examples, the data written by the VPUs 116 into respective VMEMs 112 can include updated sensor data and/or data (e.g., object or feature detection and/or classification data, object tracking data, etc.) generated based at least in part on analysis performed by the VPUs 116 on the sensor data, including object or feature locations within a frame, a classification indicating a type of an object or agent, and/or the like. In some embodiments, the VPUs 116 can provide (e.g., send, transmit, transfer, etc.) a signal to the respective DMA hardware sequencers 116 to cause the DMA hardware sequencers 116 to update one or more descriptors (described herein). For example, the VPUs 116 can send a signal to the respective DMA hardware sequencers 116 to cause the DMA hardware sequencers 116 to update one or more descriptors based at least in part on the data written by the VPUs 116 to the respective VMEMs 112.

The PPEs 118 can include one or more processors that execute one or more instructions. For example, the PPEs 118 can receive instructions from the processor 102 and the respective PPEs 118 can coordinate with the DMA hardware sequencers 114 and/or VPUs 116 to perform the one or more operations during execution of the instructions. In one illustrative example, the PPEs 118 can receive instructions from the processor 102 that cause the PPEs 118 to trigger respective DMA hardware sequencers 114 to obtain (e.g., receive, acquire, capture, etc.) sensor data from the memory 108 and store the sensor data in the respective VMEMs 112. In examples, the PPEs 118 can process the data stored in the respective VMEMs 112 and write data back to the VMEMs 112. In these examples, the data written by the PPEs 118 into respective VMEMs 112 can include updated sensor data and/or data generated based at least in part on analysis performed by the PPEs 118 on the sensor data, including object or feature locations within a frame, a classification indicating a type of an object or agent, and/or the like. In some embodiments, the PPEs 118 can send a signal to the respective DMA hardware sequencers 116 to cause the DMA hardware sequencers 116 to update one or more descriptors (described herein). For example, the PPEs 118 can send a signal to the respective DMA hardware sequencers 116 to cause the DMA hardware sequencers 116 to update one or more descriptors based at least in part on the data written by the PPEs 118 to the respective VMEMs 112. In some embodiments, the PPEs 118 can be the same as, or similar to, the PPE 200 of FIG. 1B.

The caches 120 can include a storage device that is interconnected with the VMEMs 112 and/or the instruction switch 106. As noted above, the caches 120 can receive data associated with instructions from the instruction switches 106 and load the instructions into one or more devices of the functional blocks 110 to cause the one or more devices to operate in accordance with the instructions. The DLUTs 122 can include a processor and/or memory configured to store one or more lookup tables. In some embodiments, the DLUTs 122 can be configured to enable communication between the processor 102 and one or more components of the functional blocks 110. For example, the DLUTs 122 can be configured to be in communication with the processor 102 and/or one or more memory devices of FIG. 1 (e.g., the memory 108 and/or the memory 104). The DLUT 122 can then manage the data storage and retrieval process between the processor 102 and the one or more memory devices of FIG. 1. The DLSUs 124 can include a storage device that is interconnected with the VMEMs 112 and PPEs 118 of a given functional block 110. For example, the DLSUs 124 can receive and store the sensor data obtained by the VMEMs 112 from the memory 108. Additionally, or alternatively, the DLSUs 124 can receive and store the data provide as an output by the PPEs 118.

Figure 2:
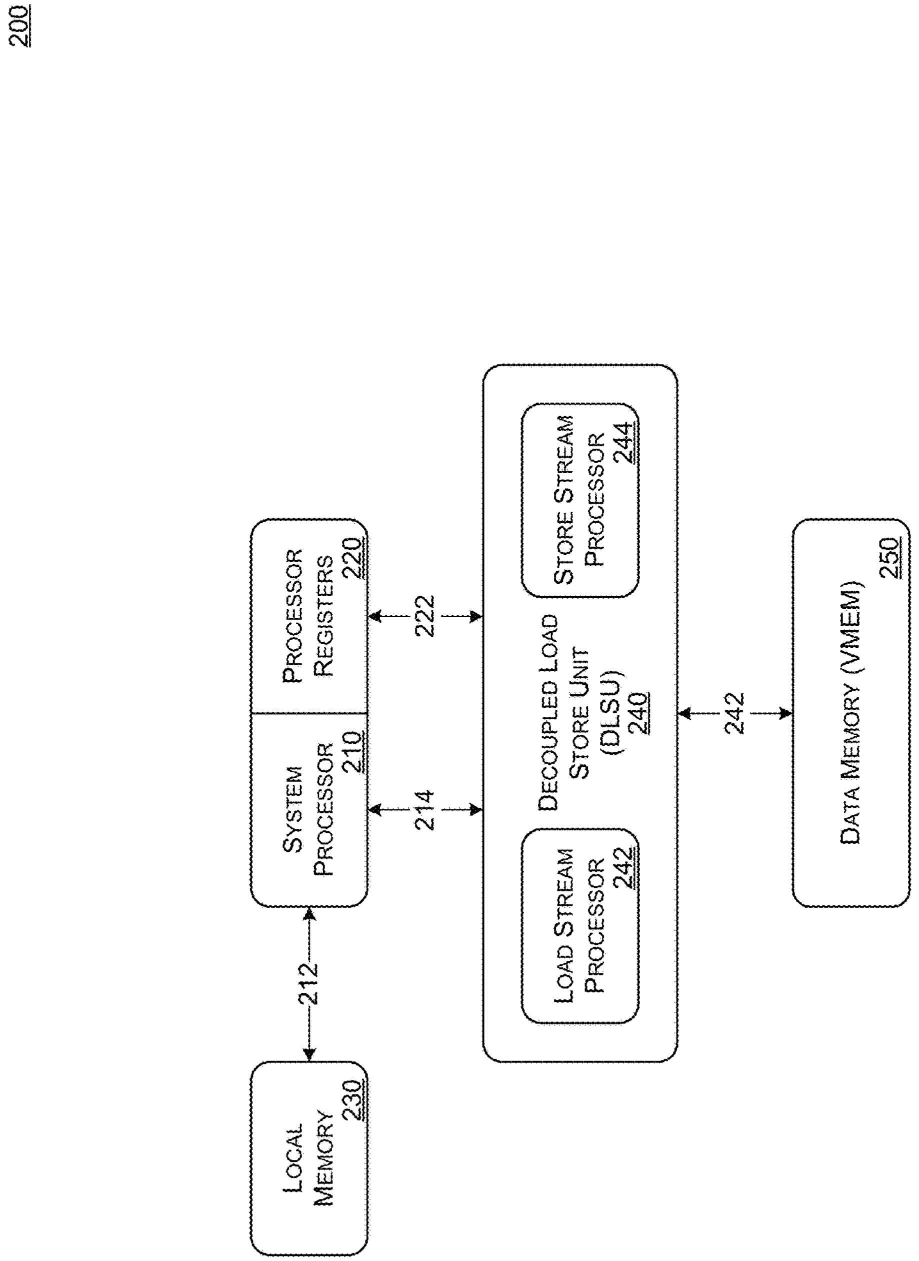
FIG. 2 depicts an example load store memory architecture, in accordance with some embodiments of the present disclosure.

FIG. 2 depicts an example load store memory architecture, according to this disclosure. As illustrated by way of example in FIG. 2, a load store memory architecture 200 can include at least a system processor 210, a processor direct I/O channel 212, a processor memory I/O channel 214, a register I/O channel 222, a local memory 230, a decoupled load store unit (DLSU) 240, and a data memory 250.

The system processor 210 can execute one or more instructions associated with the load store memory architecture 200. The processor 210 can include an electronic processor, an integrated circuit, and/or the like including one or more of digital logic, analog logic, digital sensors, analog sensors, communication buses, volatile memory, nonvolatile memory, and the like. The system processor 210 can include, but is not limited to, at least one microcontroller core, microprocessor core, central processing core, graphics processing core, physics processing core, and/or the like. The system processor 210 or the load store memory architecture 200 generally can include one or more communication bus controllers to effect communication between the system processor 210 and the other elements of the load store memory architecture 200. The system processor 210 can include processor registers 220.

The processor registers 220 can store one or more instructions that can be executed by the system processor 210 according to one or more processing elements of the system processor 210. For example, the processor registers 220 can each store a word of a predetermined length that the system processor 210 can execute. For example, the word can have a predetermined length corresponding to a bit-length capacity of the system processor 210 or a component thereof. For example, the predetermined length can be 8 bits, 16 bits, or 32 bits, but is not limited thereto. For example, the system processor 210 can execute a given word from a register of the processor registers 220 in a given cycle. For example, the system processor 210 and the processor registers 220 can be integrated into a common wafer, die or package, but are not limited thereto.

Vector processing using SIMD is a common technique used in programmable processors to accelerate applications that have data level parallelism. The SIMD instructions operate on the Register File requiring a match between the number of vector elements processed by the datapath and the vector elements being supplied or written into the register file. The register files are sized to provide high bandwidth to the datapath with low latency of read and writes.

The width of the register file is sized to match the SIMD datapath to enable a compiler to efficiently schedule operations to maximize the use of the SIMD datapath resources. Due to the low access latency requirement, the Vector Register File and SIMD data paths are implemented in close physical proximity, so sizing the two together is common practice. The data memory, on the other hand, is independently architected and potentially shared across multiple processing engines.

The processor direct I/O channel 212 can provide communication between the system processor 210 and the local memory 230. For example, the processor direct I/O channel 212 can communicatively couple the system processor 210 and the local memory 230. The processor direct I/O channel 212 can communicate one or more instructions, signals, conditions, states, and/or the like between one or more of the system processor 210 and the local memory 230. The processor direct I/O channel 212 can include one or more digital, analog, or like communication channels, lines, traces, and/or the like. For example, the processor direct I/O channel 212 can include a first communication bus having at least one serial or parallel communication line among multiple communication lines of a communication interface integrated with the system processor 210. The processor memory I/O channel 214 can provide communication between the system processor 210 and the DLSU 240. For example, the processor memory I/O channel 214 can communicatively couple the system processor 210 and the DLSU 240. The processor memory I/O channel 214 can communicate one or more instructions, signals, conditions, states, and/or the like between one or more of the system processor 210 and the DLSU 240. The processor memory I/O channel 214 can include one or more digital, analog, or like communication channels, lines, traces, and/or the like. For example, the processor memory I/O channel 214 can include a second communication bus having at least one serial or parallel communication line among multiple communication lines of the communication interface integrated with the system processor 210.

The register I/O channel 222 can provide communication between the processor registers 220 and the DLSU 240. For example, the register I/O channel 222 can communicatively couple the processor registers 220 and the DLSU 240. The register I/O channel 222 can communicate one or more instructions, signals, conditions, states, and/or the like between one or more of the processor registers 220 and the DLSU 240. The register I/O channel 222 can include one or more digital, analog, or like communication channels, lines, traces, and/or the like. For example, the register I/O channel 222 can include a third communication bus having at least one serial or parallel communication line among multiple communication lines of the communication interface integrated with the processor registers 220. The local memory 230 can store one or more instructions for operating components of the system processor 210 and operating components operably coupled to the system processor 210. For example, the one or more instructions can include one or more of firmware, software, hardware, operating systems, embedded operating systems. For example, the local memory 230 can correspond to a solid state memory device, flip flop array, register array, or any combination thereof, but is not limited thereto.

The DLSU 240 can provide data between the system processor 210 and the data memory 250 to mitigate or prevent waiting by the system processor 210 for data transfer with the data memory 250. The system processor 210 can cause the DLSU 240 to be configured to accommodate a latency of the data memory 250. For example, the DLSU 240 can be configured to prefetch a predetermined amount of data at a predetermined frequency from the data memory 250, and provide the prefetched instructions to the system processor 210 at a rate corresponding to the system processor 210 to prevent stalling of the system processor 210. For example, the DLSU 240 can be configured, as discussed herein, to prefetch a predetermined amount of data from data memory. In response, when the system processor executes load instructions 210, the data is available in the DLSU 240. Thus, the DLSU 240 can decouple fetching operations for the data memory 250 from the read and write operations of the system processor 210, to provide a technical improvement to allow a faster processor to reliably read and write with a slower memory at the silicon level. The decoupled load store unit (DLSU) 240 can include a load stream processor 242, and a store stream processor 244. The decoupled load store unit (DLSU) 240 can include one or more logical or electronic devices including but not limited to integrated circuits, logic gates, flip flops, gate arrays, programmable gate arrays, and the like.

In an aspect, the DLSU 240 implements the load stream processor 242 and the store stream processor 244, allowing multiple load/store operations to be issued from a processor pipeline and to be handled in the background by the DLSU 240. The sizing of buffers (e.g., queues) of the load stream processor 242 and the store stream processor 244 can be based on a number of inflight load/stores to support active operation continuously by the system processor 210 with the DLSU fetching with the data memory 250 in the background. For example, if a load queue or a store queue is full and the processor issues another vector load or store operation, the processor can become stalled until a queue can accept data. For example, the DLSU can include one or more queue structures to ensure that the loads and stores are processed in the order they are issued by the processor, to provide a technical improvement to ensure memory ordering, but are not limited thereto.

The load stream processor 242 can load a predetermined amount of data from the data memory 250 during at least one given cycle. For example, the load stream processor 242 can load an amount of data during a cycle of the data memory 250, where the amount of data corresponds to a number of instruction that can be executed by the system processor 210. The load stream processor 242 can include one or more logical or electronic devices including but not limited to integrated circuits, logic gates, flip flops, gate arrays, programmable gate arrays, and the like. The load stream processor 242 can be fabricated on a silicon device (e.g., a die or wafer) of the DLSU 240, or otherwise integrated with the DLSU 240. Thus, the load stream processor 242 can provide a technical improvement of low latency on-die prefetching of data from a lower-speed device (e.g., the data memory 250) to a higher-speed device (e.g., the system processor 210).

The store stream processor 244 can store a predetermined amount of data to the data memory 250 during at least one given cycle. For example, the store stream processor 244 can store an amount of data during a cycle of the data memory 250, where the amount of data corresponds to a number of instruction that can be executed by the system processor 210. The store stream processor 244 can include one or more logical or electronic devices including but not limited to integrated circuits, logic gates, flip flops, gate arrays, programmable gate arrays, and the like. The store stream processor 244 can be fabricated on a silicon device (e.g., a die or wafer) of the DLSU 240, or otherwise integrated with the DLSU 240. Thus, the store stream processor 244 can provide a technical improvement of low latency on-die prebuffering of data from a higher-speed device (e.g., the system processor 210) to a lower-speed device (e.g., the data memory 250).

The data memory 250 can store data associated with the system processor 210. The data memory 250 can include one or more hardware memory devices to store binary data, digital data, and/or the like. The data memory 250 can include one or more electrical components, electronic components, programmable electronic components, reprogrammable electronic components, integrated circuits, semiconductor devices, flip flops, arithmetic units, and/or the like. The data memory 250 can include at least one of a non-volatile memory device, a solid-state memory device, a flash memory device, or a NAND memory device. The data memory 250 can include one or more addressable memory regions disposed on one or more physical memory arrays. A physical memory array can include a NAND gate array disposed on, for example, at least one of a particular semiconductor device, integrated circuit device, and printed circuit board device. For example, the data memory 250 can be fabricated on a silicon device (e.g., a die or wafer) of the DLSU 240, or otherwise integrated with the DLSU 240. The data memory can have a memory hardware architecture with a larger memory capacity than the local memory 230 (e.g., NAND memory integrated into a die) to accommodate storage of large volumes of data at batch processing speeds that are lower than processing speeds of the system processor 210. For example, input and output data-structures that can be much larger than the capacity of the local memory 230 or the processor registers 220, are stored in the data memory 250. The data memory 250 is thus sized for larger capacity at the expense of bandwidth and access latency. The DLSU 240 can thus provide a technical solution to move data between the processor registers 220 and the data memory 250, to provide a technical improvement of maintaining data throughput at a level sufficient to prevent stalling of the system processor 210.

In an aspect, the DLSU 240 can provide, concurrently with the data between the first processor and the memory device at the first latency, the data between the second processor and the stream processor at the second latency. For example, the first processor corresponds to the DLSU 240, the memory device corresponds to the data memory 250, and the second processor corresponds to the system processor 210. For example, the first latency corresponds to a processing speed of the data memory 250, and the second latency corresponds to a processing speed of the system processor 210. For example, the processing speed of the data memory 250 is lower than the processing speed of the system processor 210.

In an aspect, the system is configured to provide an amount of data of the data during a cycle. For example, the amount of data corresponds to an amount of data that can be executed by the system processor 210 in a time period between read or write operations of the data memory 250. For example, if the system processor 210 can execute 10 instructions in the time required to fetch data from the data memory 250, the DLSU can be configured to pre-fetch 10 instructions in a single read request to the data memory 250. In an aspect, the amount of data is based on at least one of the dimension of the memory device or a length of a buffer of the stream processor. For example, the dimension of the memory device can correspond to an arrangement of data in the data memory according to one or more rows and columns of the data memory. The DLSU 240 can be configured to fetch and load, or buffer and store, data with the data memory 250 according to the dimensions of the data memory 250, to provide a technical improvement to rapidly load and store data at the processor hardware level to eliminate processor stalling due to memory latency.

Figure 3:
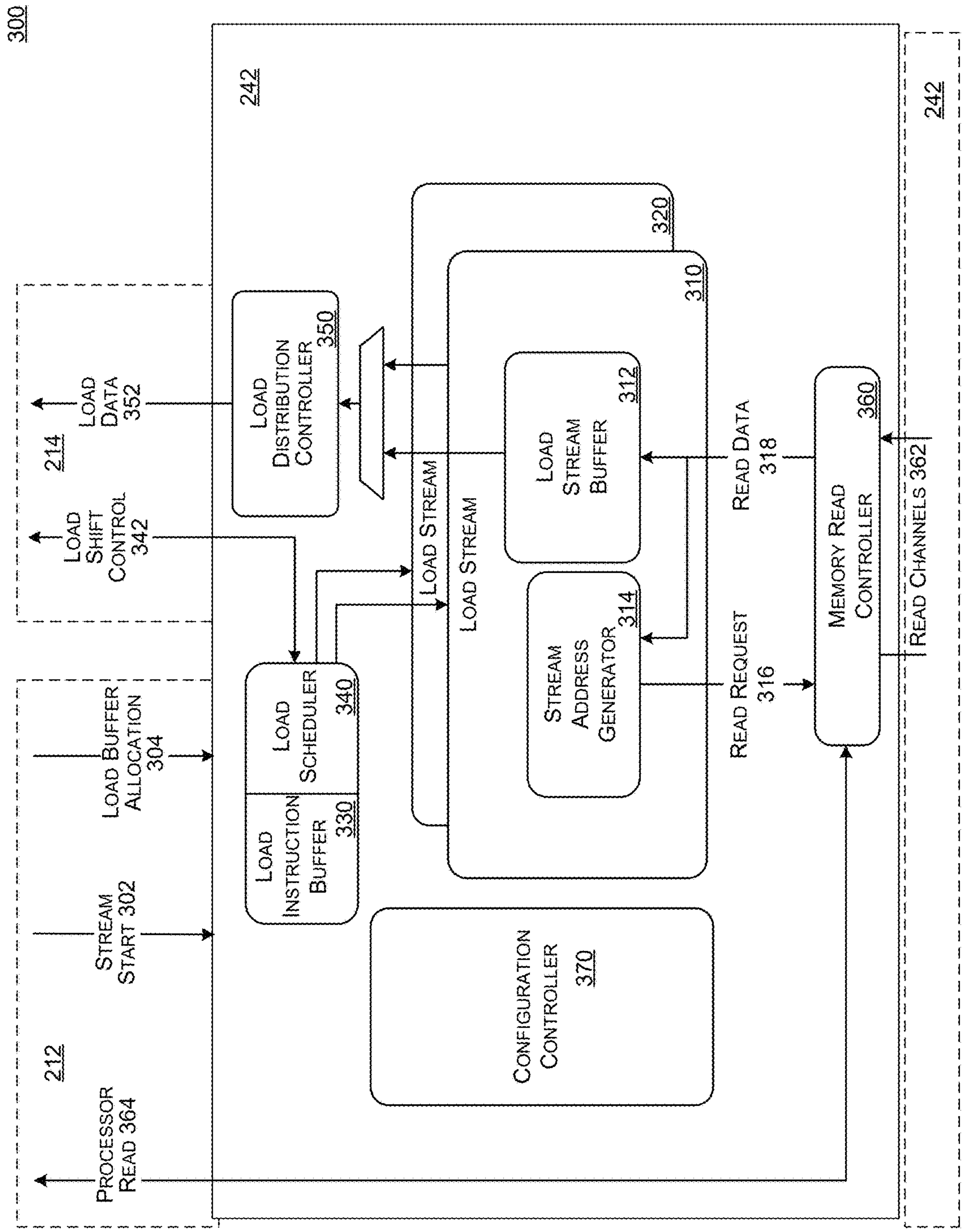
FIG. 3 depicts an example load stream processor, in accordance with some embodiments of the present disclosure.

FIG. 3 depicts an example load stream processor, according to this disclosure. As illustrated by way of example in FIG. 3, a load stream processor 300 can include at least a stream start channel 302, a load buffer allocation channel 304, load stream devices 310 and 320, a load instruction buffer 330, a load shift control channel 342, a load distribution controller 350, a memory read controller 360, a processor read channel 364, and a configuration controller 370. In an aspect, for load operations, once a stream is started, each load stream prefetches data from the data memory 250 into the load stream 310 or 320, in advance of a vector load (VLD) instruction issued by the system processor 210. Compiler instructions for VLD operations can schedule vector loads, assuming the data is available in the load stream buffer and sees latency equal to the other number of rows in the processor registers. (e.g., to load 1 row of data in the processor registers 220 per clock cycle). The depth of the Load Stream Buffer can thus cover the latency of the reads to VMEM to eliminate stalling of the system processor 210.

The stream start channel 302 can provide a predetermined amount of data to begin one or more read operations from the data memory 250, via the DLSU 240. For example, the stream start channel 302 can provide a predetermined amount of data to the configuration controller 370 to configure the DLSU 240 or one or more components thereof as discussed herein. For example, the stream start channel 302 can provide one or more VLD or VST instructions, or one more instructions based on the VLD or VST instructions, to the configuration controller 370. The stream start channel 302 can include one or more digital, analog, or like communication channels, lines, traces, and/or the like. The load buffer allocation channel 304 can provide a predetermined amount of data to configure one or more of the load stream 310 or 320, or any component thereof. For example, the load buffer allocation channel 304 can provide a predetermined amount of data to the configuration controller 370 to configure the load instruction buffer 330 according to the processing speed of the system processor and the processing speed of the data memory 250. For example, the configuration controller 370 can configure the load instruction buffer 330 to set a buffer length (or a queue length) for one or more of the load streams 310 and 320, either collectively or individually according to the instructions provided by the load buffer allocation channel 304. The load buffer allocation channel 304 can include one or more digital, analog, or like communication channels, lines, traces, and/or the like.

The load stream devices 310 and 320 can pre-fetch data from the data memory 250 and provide data at a rate corresponding to the processing speed of the system processor 210, to prevent stalling of the system processor 210. For example, the load stream device 310 can correspond to a first load stream with the data memory 250. For example, the first load stream can correspond to a first memory region of the data memory 250. For example, a first memory region can correspond to a first set of dimensions corresponding to a first set of address of the data memory 250. For example, the load stream device 320 can correspond to a second load stream with the data memory 250. For example, the second load stream can correspond to a second memory region of the data memory 250. For example, a second memory region can correspond to a second set of dimensions corresponding to a second set of address of the data memory 250. The load stream devices 310 and 320 can each respectively include an instance of a load stream buffer 312, a stream address generator 314, a read request channel 316, and a read data channel 318. In an aspect, the stream processor comprises a plurality of stream processors each respectively configured to perform at least one read operation or at least one write operation with the memory device. In an aspect, the stream processor is configured according to the first latency and based at least on one or more instructions generated by a compiler. In an aspect, the one or more instructions generated by the compiler instruct the stream processor to load the data from the memory device. In an aspect, the one or more instructions generated by the compiler instruct the stream processor to store the data to the memory device. In an aspect, the system can provide, from the second processor to the first processor, an instruction to start configuration of the stream processor.

The load stream buffer 312 can include a hardware first-in-first-out queue to load data from the data memory 250. For example, the load stream buffer 312 can load data from the data memory 250 according to the amount of data of the configuration of the DLSU 240 by the configuration controller 370. While the load stream buffer 312 is described and illustrated by way of example as a FIFO queue, the load stream buffer 312 can include or be replaced by a buffer, and is not limited to a FIFO queue or a buffer as discussed herein. For example, a stream buffer according to the load stream buffer 312 can have a width that matches with the data delivered (load) or received (store) to the processor per clock cycle. For example, where the system processor is a PPE, the system processor 210 can be configured to match the width of 2 vector registers in each row of the PE array (e.g., 32-bits×2 Registers×8 PE/row=512-bits).

The stream address generator 314 can select one or more address locations of the data memory 250. For example, the stream address generator 314 can select memory locations according to one or more regions of the data memory 250 corresponding to the given load stream of the stream address generator 314. For example, the stream address generator 314 can select memory locations according to one or more dimensions of the data memory 250 corresponding to the given load stream of the stream address generator 314. For example, the number of prefetched requests from the data memory 250 (VMEM) can depend on one or more of available space in the load stream buffer, and availability of the stream address generator 314 to perform loads to the data memory 250. The stream address generator 314, once programmed by configuration controller 370 from the system processor 210, can generate addresses for all the subsequent memory operations associated with that stream. This allows the load/stores to be decoupled from the processor since the processor is no longer needed to compute the memory addresses associated with the load/store operations. An example architecture can include a 6-dimensional address generator, but is not limited thereto. For example, the stream address generator 314 can be configured to target the data throughput for an application domain. The number of load and store streams can be designed based on the maximum number of independent load/store data structures needed to support the application at any given time.

The read request channel 316 can provide a predetermined amount of data from the load stream device 310 or 320 to the memory read controller 360 to request data from the data memory 250. The read request channel 316 can include one or more digital, analog, or like communication channels, lines, traces, and/or the like. The read data channel 318 can provide a predetermined amount of data from the load stream device 310 or 320 to the memory read controller 360 to receive data from the data memory 250 according to the request via the read request channel 316. The read data channel 318 can include one or more digital, analog, or like communication channels, lines, traces, and/or the like.

The load instruction buffer 330 can store a predetermined amount of data via the system processor 210 to fetch a predetermined amount of data from the DLSU 240 via the data memory 250. For example, the load instruction buffer 330 can buffer requests by the system processor 210 for data from the data memory 250, and can store those instructions in a queue before providing those instructions to the load stream device 310 or 320. For example, the load instruction buffer 330 can include or correspond to a device implementing a FIFO queue, but is not limited thereto. The load scheduler 340 can control loading of one or more registers of the processor registers 220. For example, the load scheduler 340 can select a row of the processor registers 220 for loading data from the load stream device 310 or 320. The load scheduler 340 can instruct the processor register 220 to select a given row to receive data from the load stream device 310 or 320. The load scheduler 340 can include a load shift control channel 342. The load shift control channel 342 can provide a predetermined amount of data between the load scheduler 340 and the processor register 220 to provide control instructions from the load scheduler 340 to the processor registers 220. The load shift control channel 342 can include one or more digital, analog, or like communication channels, lines, traces, and/or the like. The load distribution controller 350 can coordinate concurrent load operations from the load stream device 310 and 320 into the processor registers 220. For example, the load distribution controller 350 can select a load stream device 310 or 320 according to a control instruction from the load scheduler 340. The load distribution controller 350 can include a load data channel 352. The load data channel 352 can provide a predetermined amount of data between the load scheduler 340 and the processor register 220 to provide data from the DLSU 240 to the processor registers 220. The load data channel 352 can include one or more digital, analog, or like communication channels, lines, traces, and/or the like.

The memory read controller 360 can perform one or more read operations corresponding to a configuration via the configuration controller 370. For example, the memory read controller 360 can perform a read instruction with the data memory 250 to request a amount of data according to a configuration to prevent stalling of the system processor 210, as discussed herein. The memory read controller 360 can include read channels 362. The read channels 362 can provide a predetermined amount of data between the load stream device 310 and 320, and the data memory 250, to provide data to the DLSU 240 from the data memory 250. The read channels 362 can include one or more digital, analog, or like communication channels, lines, traces, and/or the like. The processor read channel 364 can provide control instructions between the memory read controller 360 and the system processor 210 to provide direct loading and storing into the system processor 210. For example, the memory read controller 360 can provide instructions having a first type to the load stream devices 310 and 320, and provide instructions not having the first type to the system processor 210. For example, the first type can correspond to data, and the non-first type data can correspond to control instructions for the system processor 210. The processor read channel 364 can include one or more digital, analog, or like communication channels, lines, traces, and/or the like.

The configuration controller 370 can modify one or more states of one or more devices of the DLSU 240. For example, the configuration controller 370 can configure each of the load stream devices 310 and 320, the stream FIFO 312 of each of the stream devices 310 and 320, the stream address generator 314 of each of the stream devices 310 and 320, the load distribution controller, and components of the store stream processor 244 as discussed herein. Thus, the configuration controller 370 can modify an operating state of the load stream processor 242, the store stream processor 244, and the components therein, to effect DLSU operation according to latency of the system processor 210 and the data memory 250. The configuration controller 370 can provide a technical improvement to prevent stalling of the system processor 210 with respect to read and write operations with the data memory 250. For example, the configuration controller 370 can interface with a processor pipeline including the channels 212 and 214. For example, the configuration controller 370 can handle VLD and VST instructions issued by the system processor 210. For example, the configuration controller 370 can perform the read/write to one or more devices of the DLSU 240 in the background. For example, the configuration controller 370 can correspond to a non-transitory memory as discussed herein. In an aspect, the non-transitory computer readable medium can include a predetermined amount of data executable by a processor (e.g., the system processor 210). The system processor 210 can configure, according to the first latency of the memory device, a length of a buffer of the stream processor. In an aspect, the configuration controller 370 can configure, according to the first latency of the memory device, a length of a buffer of the stream processor.

Figure 4:
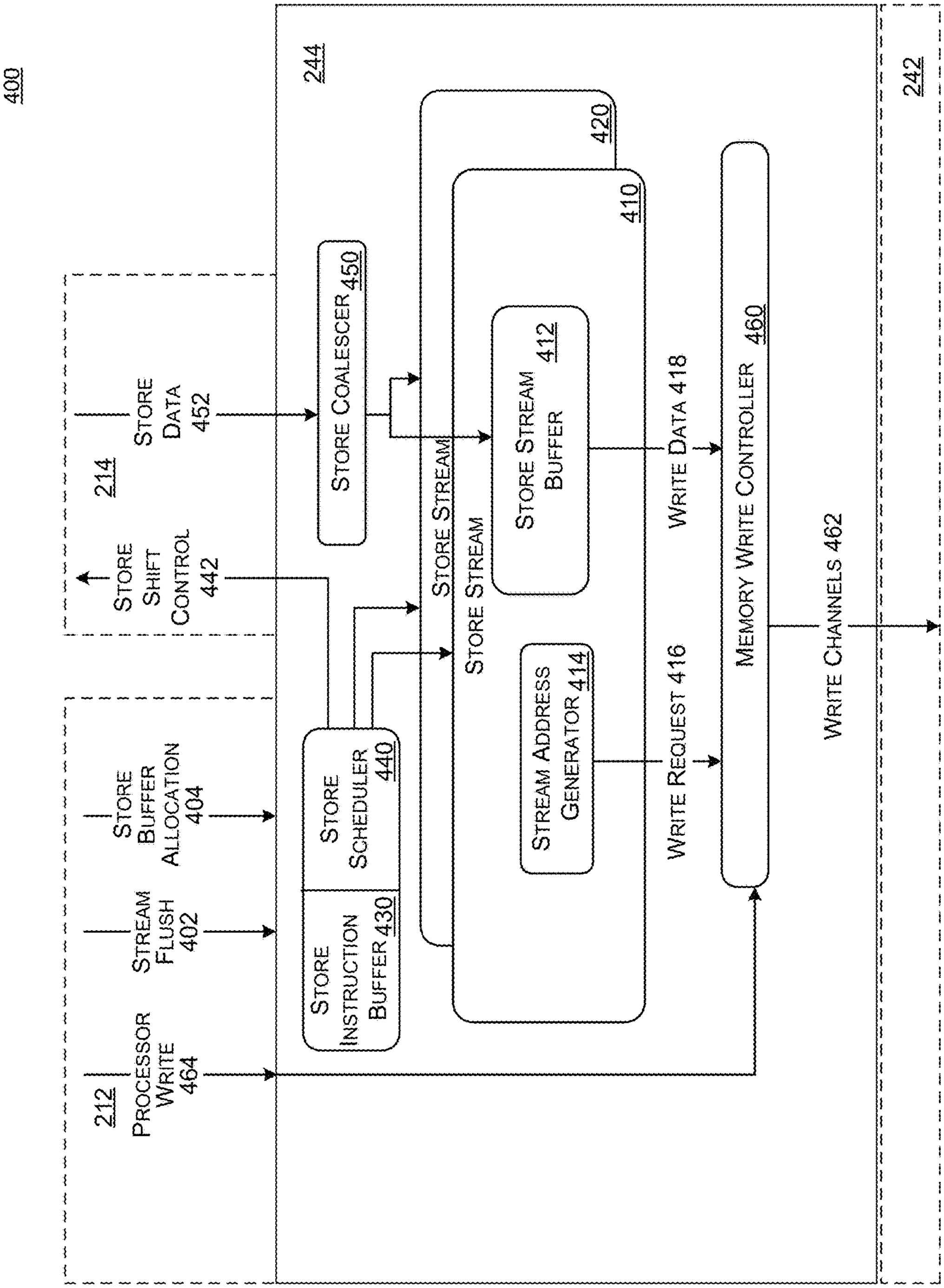
FIG. 4 depicts an example store stream processor, in accordance with some embodiments of the present disclosure.

FIG. 4 depicts an example store stream processor, according to this disclosure. As illustrated by way of example in FIG. 4, a store stream processor 400 can include at least a stream flush channel 402, a store buffer allocation channel 404, store stream devices 410 and 420, a store instruction buffer 430, a store scheduler 440, a store coalescer 450, and a memory write controller 460. In an aspect, for stores streams, VS) instructions control reading of data from the processor registers 220 to write to the store stream processor 400. For example, this storing can occur at a rate corresponding to storing one row of the data memory 250 per clock cycle of the data memory 250.

The stream flush channel 402 can provide a predetermined amount of data to clear one or more configurations from the DLSU 240, including the load stream processor 2142, the store stream processor 244, or any component thereof. For example, the stream flush channel 402 can provide a predetermined amount of data to set the stream devices 410 and 420, the stream buffer 430, the stream scheduler 440, the store coalescer 450, or any combination thereof, into a configuration state to be modifiable by the configuration controller 370. The stream flush channel 402 can include one or more digital, analog, or like communication channels, lines, traces, and/or the like.

The store buffer allocation channel 404 can provide a predetermined amount of data to configure one or more of the store stream 410 or 420, or any component thereof. For example, the store buffer allocation channel 404 can provide a predetermined amount of data to the configuration controller 370 to configure the store instruction buffer 430 according to the processing speed of the system processor and the processing speed of the data memory 250. For example, the configuration controller 370 can configure the store instruction buffer 430 to set a buffer length (or a queue length) for one or more of the store streams 410 and 420, either collectively or individually according to the instructions provided by the store buffer allocation channel 404. The store buffer allocation channel 404 can include one or more digital, analog, or like communication channels, lines, traces, and/or the like.

The store stream devices 410 and 420 can obtain or hold data for storage to the data memory 250 at a rate corresponding to the processing speed of the system processor 210, to prevent stalling of the system processor 210. For example, the store stream device 410 can correspond to a first store stream with the data memory 250. For example, the first store stream can correspond to a first memory region of the data memory 250. For example, a first memory region can correspond to a first set of dimensions corresponding to a first set of address of the data memory 250. For example, the store stream device 420 can correspond to a second store stream with the data memory 250. For example, the second store stream can correspond to a second memory region of the data memory 250. For example, a second memory region can correspond to a second set of dimensions corresponding to a second set of address of the data memory 250. The memory regions and dimensions of the store stream devices 410 and 420 can correspond to or be distinct from the memory regions and the dimensions of the load stream devices 310 and 320. The store stream devices 410 and 420 can each respectively include an instance of a store stream buffer 412 and a stream address generator 414.

The store stream buffer 412 can include a hardware first-in-first-out queue to store data to the data memory 250. For example, the store stream buffer 412 can store data to the data memory 250 according to the amount of data of the configuration of the DLSU 240 by the configuration controller 370. While the store stream buffer 412 is described and illustrated by way of example as a FIFO queue, the store stream buffer 412 can include or be replaced by a buffer, and is not limited to a FIFO queue or a buffer as discussed herein. For example, a stream buffer according to the store stream buffer 412 can have a width that matches with the data delivered (load) or received (store) to the processor per clock cycle. For example, where the system processor is a PPE, the system processor 210 can be configured to match the width of 2 vector registers in each row of the PE array (e.g., 32-bits×2 Registers×8 PE/row=512-bits), correspondingly to the store stream buffer 412, but is not limited thereto.

The stream address generator 414 can select one or more address locations of the data memory 250. For example, the stream address generator 414 can select memory locations according to one or more regions of the data memory 250 corresponding to the given store stream of the stream address generator 414. For example, the stream address generator 414 can select memory locations according to one or more dimensions of the data memory 250 corresponding to the given store stream of the stream address generator 414. For example, the number of prefetched requests for storage to the data memory 250 (e.g., VMEM) can depend on one or more of available space in the store stream buffer, and availability of the stream address generator 414 to perform stores to the data memory 250. The stream address generator 414, once programmed by configuration controller 370 from the system processor 210, can generate addresses for all the subsequent memory operations associated with that stream. This allows the store/stores to be decoupled from the processor since the processor is no longer needed to compute the memory addresses associated with the store/store operations. An example architecture can include a 6-dimensional address generator, but is not limited thereto. For example, the stream address generator 414 can be configured to target the data throughput for an application domain. The number of store and store streams can be designed based on the maximum number of independent store/store data structures needed to support the application at any given time. For example, the stream address generator 414 can write back data to the data memory 250 in the background, allowing the PPE to move forward once data for the vector register is copied to the store stream devices 410 or 420.

The write request channel 416 can provide a predetermined amount of data from the store stream device 410 or 420 to the memory write controller 460 to request a write operation of data to the data memory 250. The write request channel 416 can include one or more digital, analog, or like communication channels, lines, traces, and/or the like. The write data channel 418 can provide a predetermined amount of data from the store stream device 410 or 420 to the memory write controller 460 to provide data to the data memory 250 according to the request via the write request channel 416. The write data channel 418 can include one or more digital, analog, or like communication channels, lines, traces, and/or the like.

The store instruction buffer 430 can store a predetermined amount of data via the system processor 210 to fetch a predetermined amount of data from the DLSU 240 via the data memory 250. For example, the load instruction buffer 330 store instruction buffer 430 can buffer requests by the system processor 210 for data to be stored at the data memory 250, and can store those instructions in a queue before providing those instructions to the store stream device 410 or 420. The store scheduler 440 can control reading of one or more registers of the processor registers 220. For example, the store scheduler 440 can select a row of the processor registers 220 for reading data into the store stream device 410 or 420. The store scheduler 440 can instruct the processor register 220 to select a given row to provide data to the store stream device 410 or 420. The store scheduler 440 can include a store shift control channel 442. The store shift control channel 442 can provide a predetermined amount of data between the store scheduler 440 and the processor register 220 to provide control instructions from the store scheduler 440 to the processor registers 220. The store shift control channel 442 can include one or more digital, analog, or like communication channels, lines, traces, and/or the like. The store coalescer 450 can coordinate concurrent store operations from the store stream device 410 and 420 into the processor registers 220. For example, the store distribution controller 350 can select a store stream device 410 or 420 according to a control instruction from the store scheduler 440, and can allocate write operations to the stream device 410 and 420 concurrently. The store coalescer 450 can include a store data channel 452. The store data channel 452 can provide a predetermined amount of data between the store scheduler 440 and the processor register 220 to provide data to the DLSU 240 from the processor registers 220. The store data channel 452 can include one or more digital, analog, or like communication channels, lines, traces, and/or the like.

The memory write controller 460 can perform one or more write operations corresponding to a configuration via the configuration controller 370. For example, the memory write controller 460 can perform a write instruction to the data memory 250 to provide an amount of data according to a configuration to prevent stalling of the system processor 210, as discussed herein. The memory write controller 460 can include write channels 462, and a processor write channel 464. The write channels 462 can provide a predetermined amount of data between the store stream device 410 and 420, and the data memory 250, to provide data from the DLSU 240 to the data memory 250. The write channels 462 can include one or more digital, analog, or like communication channels, lines, traces, and/or the like. The processor write channel 464 can provide control instructions between the memory write controller 460 and the system processor 210 to provide direct storing and storing from the system processor 210. For example, the memory write controller 460 can provide instructions having a first type to the store stream devices 410 and 420, and provide instructions not having the first type to the system processor 210. For example, the first type can correspond to data, and the non-first type data can correspond to control instructions for the system processor 210. The processor write channel 464 can include one or more digital, analog, or like communication channels, lines, traces, and/or the like.

Figure 5:
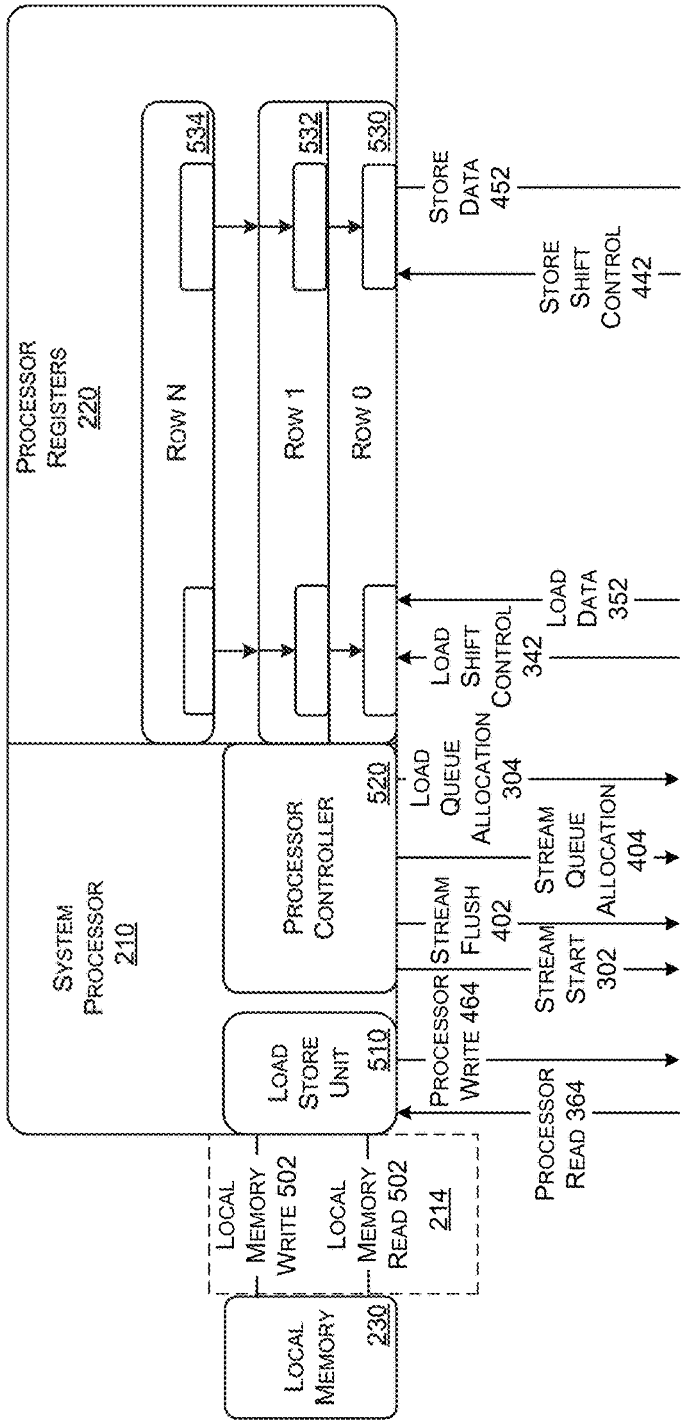
FIG. 5 depicts an example system processor, in accordance with some embodiments of the present disclosure.

FIG. 5 depicts an example system processor, according to this disclosure. As illustrated by way of example in FIG. 5, a system processor 500 can include at least a local memory write channel 502, a local memory read channel 502, a load store unit 510, a processor controller 520, and register rows 530, 532 and 534. In an aspect, the system processor 500 can correspond to the system processor 210 and can include the processor registers 220 integrated therewith in a common device. For example, the system processor 500 can be fabricated on a single wafer or die as a single silicon component, but is not limited thereto.

The local memory write channel 502 can provide a predetermined amount of data between the system processor 210 and the local memory 230, to provide data from the system processor 210 to the local memory 230 at a rate corresponding to the local memory 230. The local memory write channel 502 can include one or more digital, analog, or like communication channels, lines, traces, and/or the like. The local memory read channel 502 can provide a predetermined amount of data between the system processor 210 and the local memory 230, to provide data to the system processor 210 from the local memory 230 at a rate corresponding to the local memory 230. The local memory read channel 502 can include one or more digital, analog, or like communication channels, lines, traces, and/or the like. For example, the local memory 230 can have a capacity lower than the data memory 250, and can have a latency lower than the data memory 250.

The load store unit 510 can provide data between the system processor 210 and the local memory 230 to mitigate or prevent waiting by the system processor 210 for data transfer with the local memory 230. The system processor 210 can cause the load store unit 510 to be configured to accommodate a latency of the local memory 230. For example, the system processor 210 can be configured to prefetch a predetermined amount of data at a predetermined frequency from the local memory 230, and provide the prefetched instructions to the local memory 230 at a rate corresponding to the system processor 210 to prevent stalling of the system processor 210. Thus, the load store unit 510 can couple fetching operations for the local memory 230 from the read and write operations of the system processor 210, to provide a technical improvement to allow a faster processor to reliably read and write with a correspondingly fast local memory at the silicon level. The processor controller 520 can coordinate load and store operations between the local memory 230, the processor registers 220, and the DLSU 240, via the system processor 210. For example, the processor controller 520 can include one or more logical or physical regions of the system processor 210 dedicated to control data transfer between the local memory 230, the processor registers 220, and the DLSU 240. For example, the processor controller 520 can include one or more logical or physical regions of the system processor 210 allocated by configuration to control data transfer between the local memory 230, the processor registers 220, and the DLSU 240.

The register rows 530, 532 and 534 can each correspond to distinct memory locations of the processor registers 220. For example, the processor registers 220 can include 12 register rows 530, 532 and 534, but are not limited to any particular number of rows or dimensions as discussed herein by way of example.

In an aspect, the system processor 520 (or 210) can receive and execute one or more VLD and VST instructions from a compiler. A compiler can be configured to decouple the vector load operations and vector store operations from the processor pipeline, via an input-output register file (IORF). The IORF can be generated in addition to a vector register file (VRF). For example, vector load and stores use the IORF, whereas vector math instructions can use the VRF. The compiler can schedule moves between the IORF and VRF accounting for the multi-cycle latency of the IORF load/stores. This allows the DLSU 240 to perform the accesses to/from the data memory 250 in the background and perform read/writes to IORF when then vector load/store operations are issued from the system processor 210 to the DLSU 240. The register dependency to keep the processor interlocked can be reserved for operations that move data between the VRF and IORF. An example set of VLD and VST instructions for a compiler configured to generate machine code executable by the systems and devices discussed herein is discussed.

TABLE 1

Example Compiler Instructions for VLD and VST

| <A0, A1, A2, A3> | Code to initialize A0, A1, A2, A3 |
|---|---|
| VLD START *A0 | Program and Start A0 Load Stream |
| VLD START *A1 | Program and Start A1 Load Stream |
| VST START *A2 | Program and Start A2 Store Stream |
| VST START *A3 | Program and Start A3 Store Stream |
| VLD *A0++, I0 | Load to I0 issued to DLSU, which moves data to I0 from Load Stream |
| VLD *A1++, I1 | Load to I1 issued to DLSU, which moves data to I1 from Load Stream |
| Vmove I0, V0 | Stall if VLD to I0 has not completed from A0 Load Stream |
| Vmove I1, V1 | Stall if VLD to I1 has not completed from A1 Load Stream |
| Vmove V2, I2 | V2 is free once data is moved into I2 (single cycle) |
| Vmove V3, I3 | V3 is free once data is moved into I3 (single cycle) |
| VST I2, *A2+ | Store from I2 issued to DLSU, that moves data from I2 to ST Stream |
| VST I3, *A3+ | Store from I3 issued to DLSU, that moves data from I3 to ST Stream |
| Vmove V5, I3 | Stall if all I3 data is not written to Store Stream |

Figure 6:
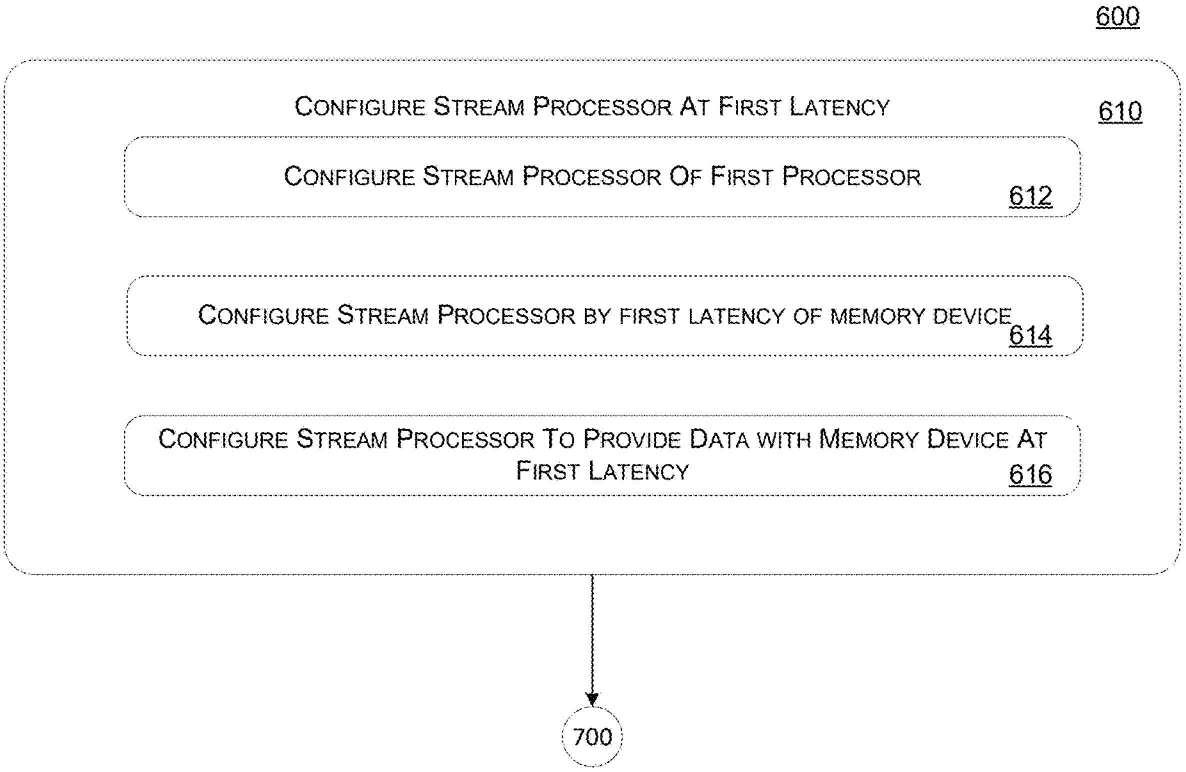
FIG. 6 depicts an example method for low-latency load and store memory operations, in accordance with some embodiments of the present disclosure.

FIG. 6 depicts an example method for low-latency load and store memory operations, according to this disclosure. At least the DLSU 240 can perform method 600. In an aspect, method 600 corresponds to a configuration of the DLSU according to one or more VLD and VST instructions provided by the compiler as discussed herein. For example, the system processor 210 can receive one or more machine-readable instructions in a format compatible with one or more hardware processing cores of the system processor 210 and the DLSU 240, and can provide the VLD and VST instructions, or instructions based on the VLD and VST instructions to the configuration controller 370. For example, the configuration controller 370 can perform at least a portion of the method 600 as discussed herein, in accordance with one or more VLD and VST instructions.

At 610, the method 600 can configure a stream processor at a first latency. For example, the configuration controller 370 can configure one or more of the load streams 310 and 320 at a first latency. For example, the configuration controller 370 can configure one or more of the store streams 410 and 420 at a first latency. For example, the first latency can correspond to a latency of the data memory as discussed herein. At 612, the method 600 can configure the stream processor of a first processor. For example, the configuration controller 370 can configure the stream address generator 314 of at least one of the load streams 310 or 320. For example, the configuration controller 370 can configure the load scheduler 340 according to a processing speed of the data memory 250. For example, the configuration controller 370 can configure the load instruction buffer 330 according to a processing speed of the data memory 250. At 614, the method 600 can configure the stream processor according to the first latency of a memory device. In an aspect, the method 600 can include configuring, according to the first latency of the memory device, a length of a buffer of the stream processor. In an aspect, the stream processor is configured according to the first latency and based at least on one or more instructions generated by a compiler. At 616, the method 600 can configure the stream processor to provide data with the memory device at the first latency.

In an aspect, the stream processor comprises a plurality of stream processors each respectively configured to perform at least one read operation or at least one write operation with the memory device. For example, the stream processor can correspond to the load stream processor 242, and can include one or more load streams 310 and 320 each configured to execute one or more concurrent load stream read operations with the data memory 250. For example, the stream processor can correspond to the store stream processor 244, and can include one or more store streams 410 and 420 each configured to execute one or more concurrent store stream write operations with the data memory 250.

Figure 7:
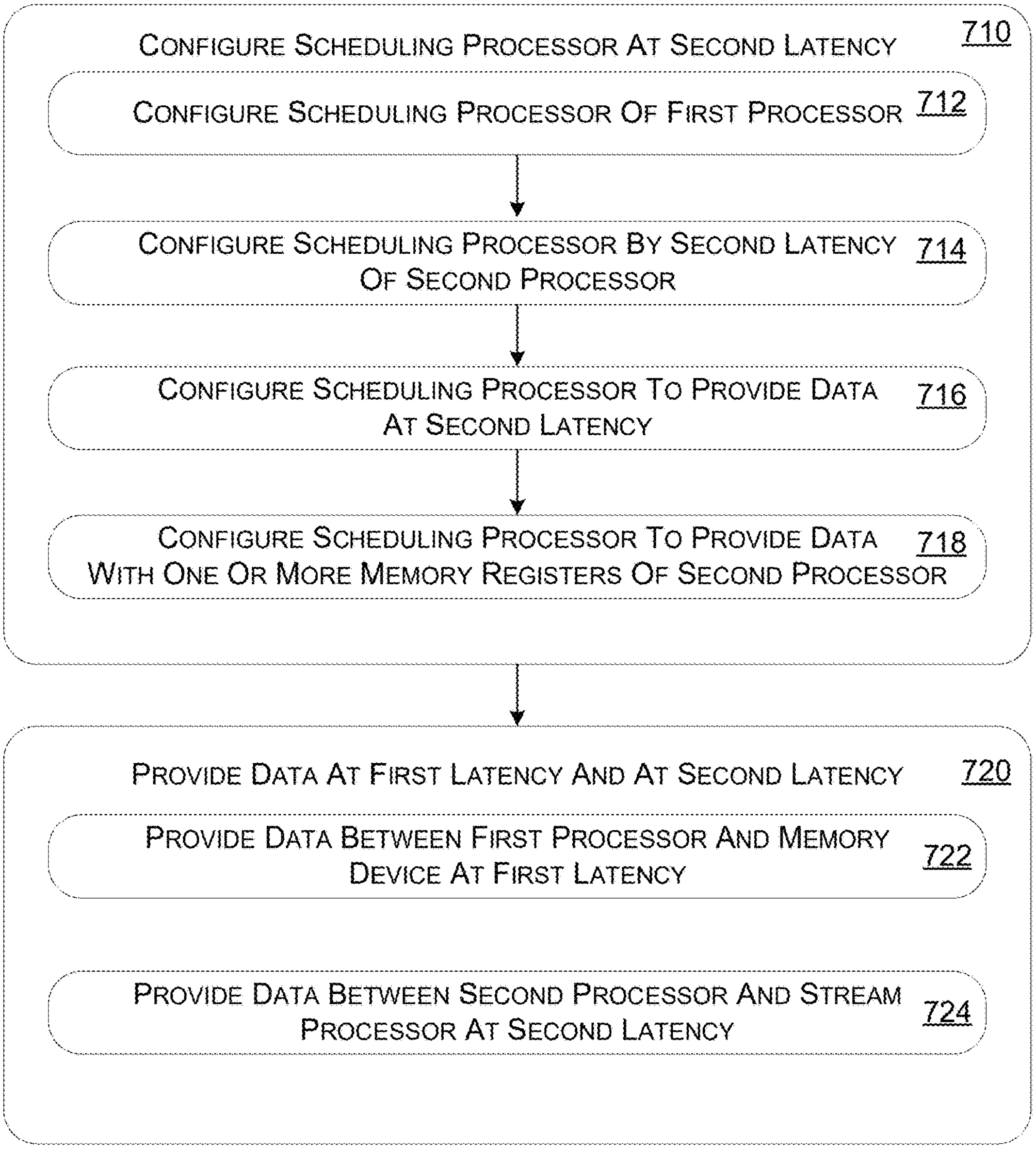
FIG. 7 depicts an example method for low-latency load and store memory operations, in accordance with some embodiments of the present disclosure.

FIG. 7 depicts an example method for low-latency load and store memory operations, according to this disclosure. At least the DLSU 240 can perform method 700. In an aspect, method 700 corresponds to a configuration of the DLSU according to one or more VLD and VST instructions provided by the compiler as discussed herein. For example, the system processor 210 can receive one or more machine-readable instructions in a format compatible with one or more hardware processing cores of the system processor 210 and the DLSU 240, and can provide the VLD and VST instructions, or instructions based on the VLD and VST instructions to the configuration controller 370. For example, the configuration controller 370 can perform at least a portion of the method 700 as discussed herein, in accordance with one or more VLD and VST instructions.

At 710, the method 700 can configure a scheduling processor at a second latency. For example, the configuration controller 370 can configure the load scheduler 340 according to the second latency of the system processor 210. For example, the configuration controller 370 can configure the stream scheduler 440 according to the second latency of the system processor 210. At 712, the method 700 can configure the scheduling processor of the first processor. For example, the configuration controller 370 can configure the load scheduler 340 of the DLSU 240. For example, the configuration controller 370 can configure the stream scheduler 440 of the DLSU 240. At 714, the method 700 can configure the scheduling processor according to the second latency of a second processor. At 716, the method 700 can configure the scheduling processor to provide the data at the second latency. At 718, the method 700 can configure the scheduling processor to provide the data with one or more memory registers of the second processor. For example, the configuration controller 370 can configure the load scheduler 340 to provide the data from the load stream 310 or 320 to the processor registers 220, at a speed corresponding to the system processor 210 to prevent stalling of the system processor 210. For example, the configuration controller 370 can configure the stream scheduler 440 to buffer the data from the store stream 310 or 320 to the data memory 250, at a speed corresponding to the system processor 210 to prevent stalling of the system processor 210.

At 720, the method 700 can provide the data at the first latency and at the second latency. In an aspect, the method can include providing, concurrently with the data between the first processor and the memory device at the first latency, the data between the second processor and the stream processor at the second latency. In an aspect, the stream processor is configured to provide a amount of data of the data during a cycle. In an aspect, the amount of data is based on at least one of the dimensions of the memory device or a length of a buffer of the stream processor. At 722, the method 700 can provide the data between the first processor and the memory device at the first latency. At 724, the method 700 can provide the data between the second processor and the stream processor at the second latency.

Figure 8:
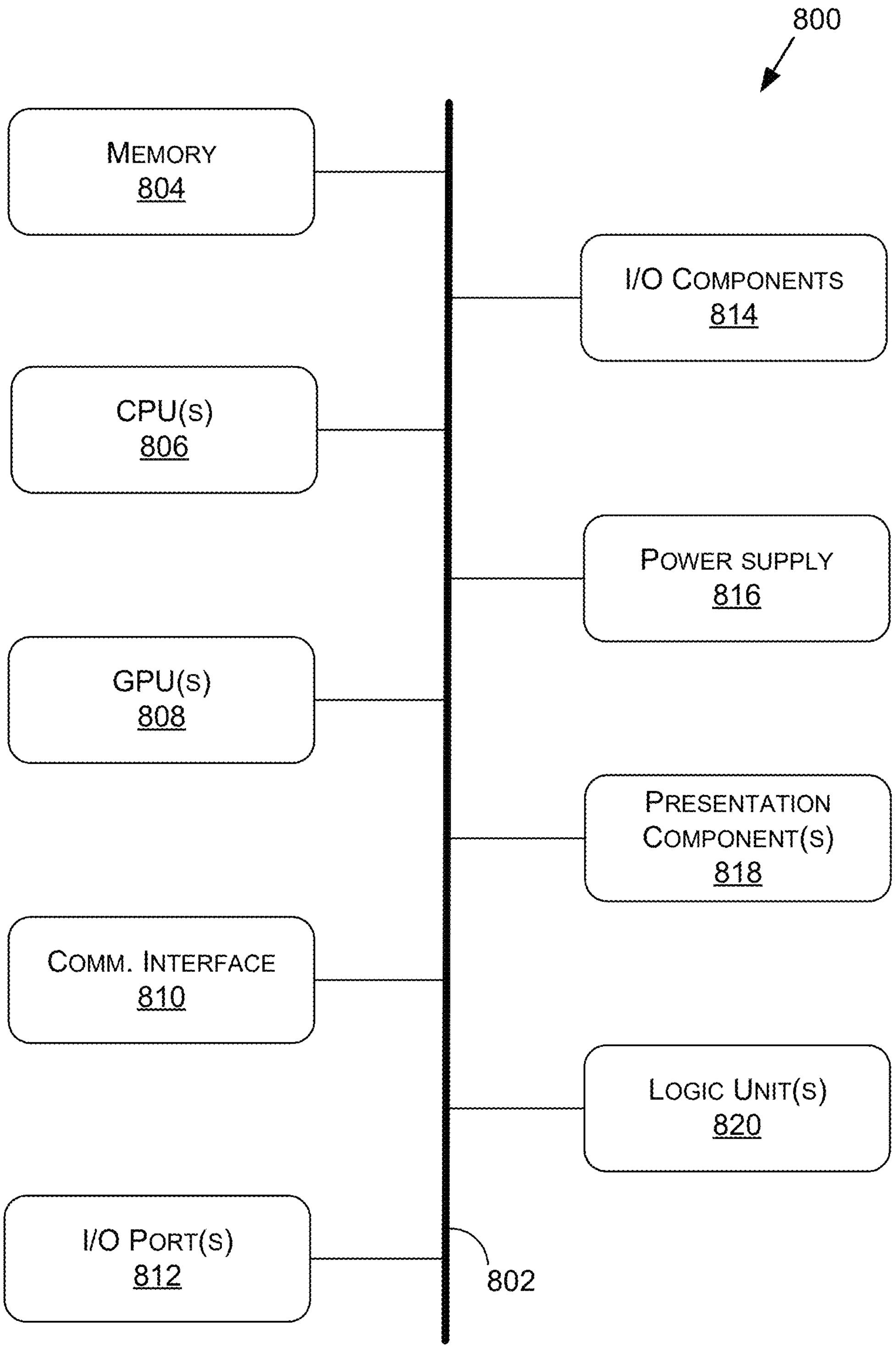
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may include one or more virtual machines (VMs), and/or any of the components thereof may include virtual components (e.g., virtual hardware components). For non-limiting examples, one or more of the GPUs 808 May include one or more vGPUs, one or more of the CPUs 806 may include one or more vCPUs, and/or one or more of the logic units 820 may include one or more virtual logic units. As such, a computing device(s) 800 may include discrete components (e.g., a full GPU dedicated to the computing device 800), virtual components (e.g., a portion of a GPU dedicated to the computing device 800), or a combination thereof. In some embodiments, the example computing device 800 and/or one or more components of the example computing device 800 can be the same as, or similar to, one or more of the device and/or components of FIGS. 1-4, 8 and 10A-10D.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may include computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not include signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Figure 9:
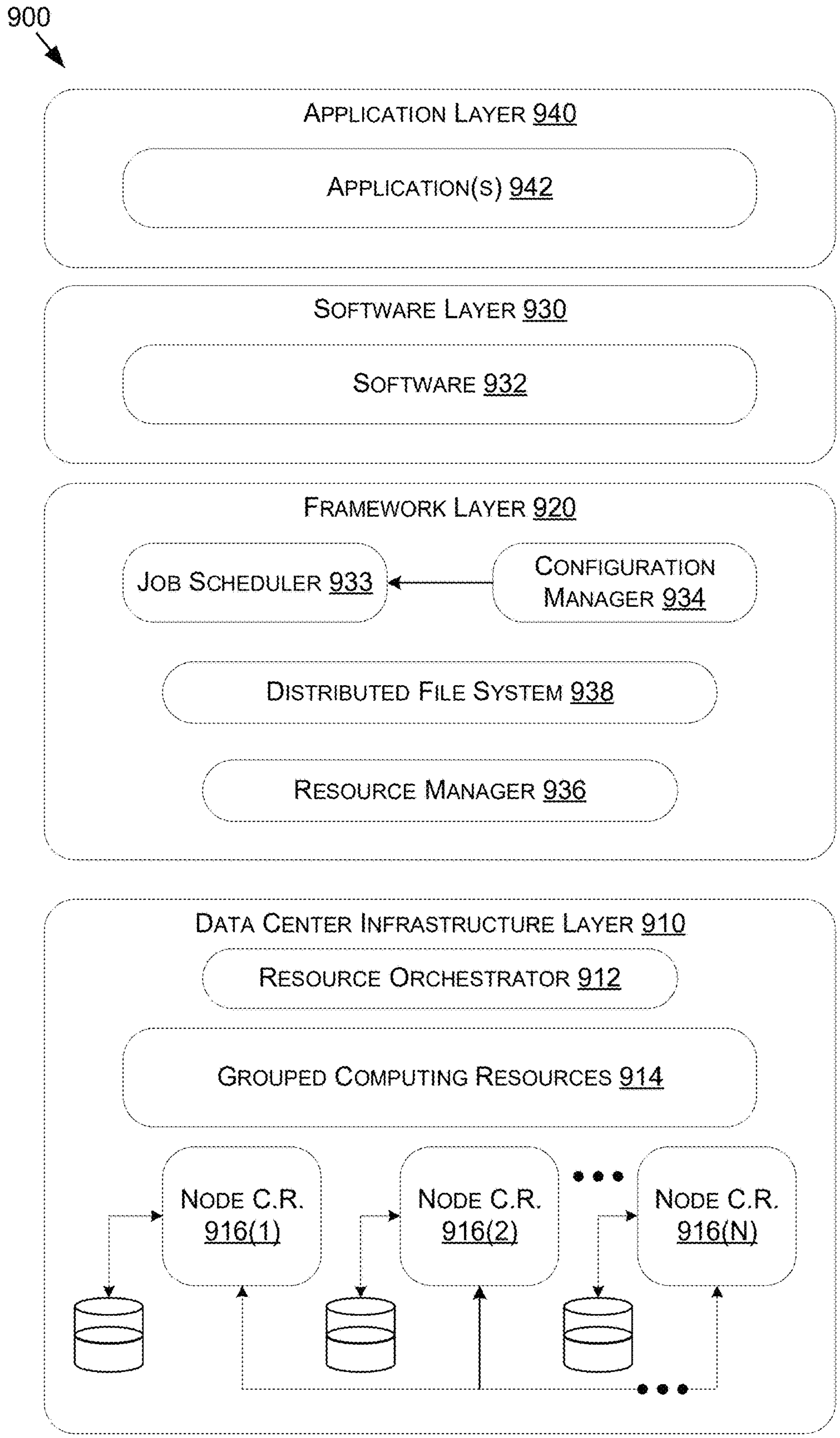
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940. In some embodiments, one or more of the devices described with respect to FIGS. 1-4, 8 and 10A-10D can interconnect with one or more devices of the example data center 900 to establish communication connections. In these examples, the one or more of the devices described with respect to FIGS. 1-4, 8 and 10A-10D can coordinate with the one or more devices of the data center 900 to perform one or more of the operations described herein.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-916(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Figure 10A:
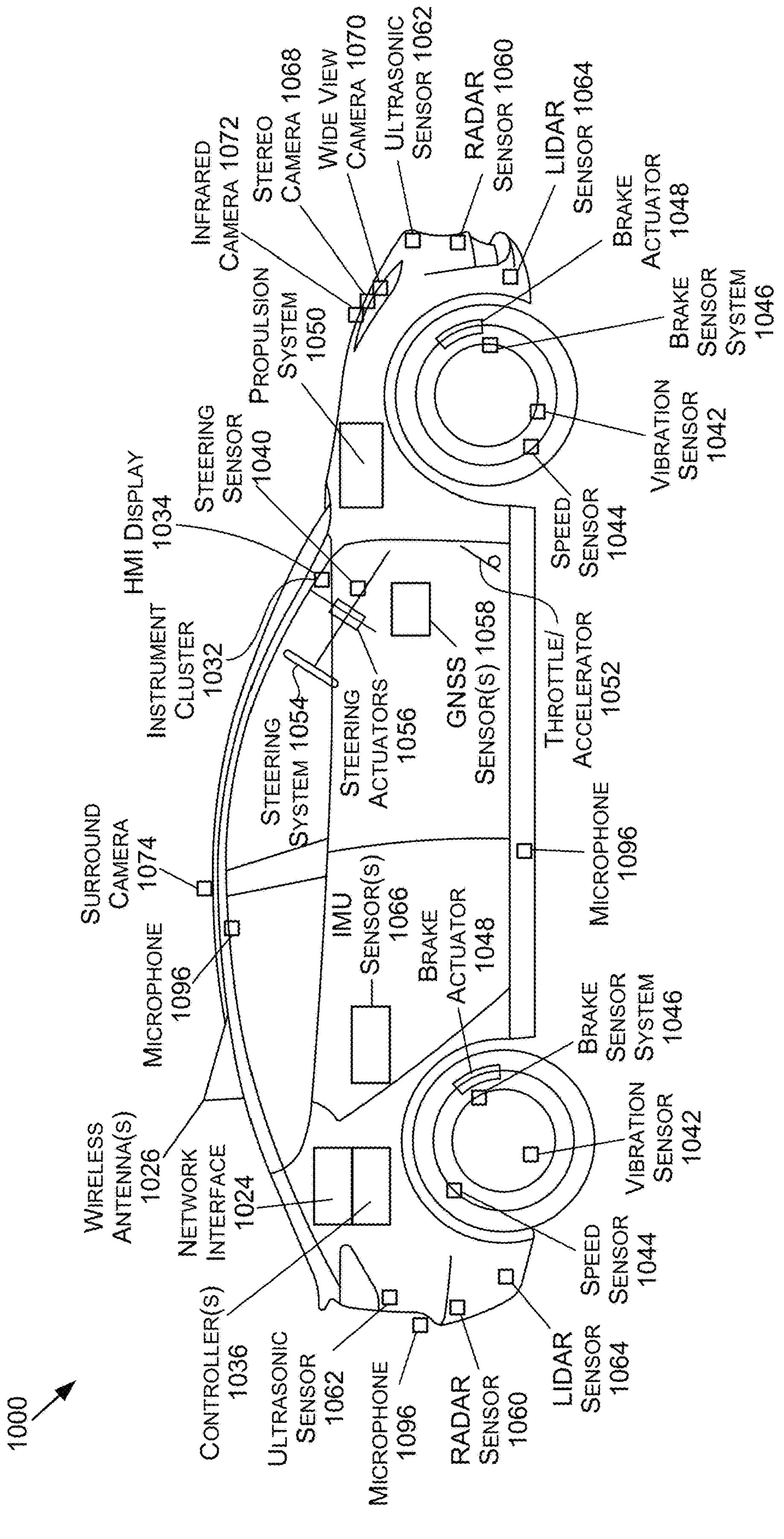
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052. In some embodiments, one or more of the devices and/or components of the vehicle 1000 can be the same as, or similar to, one or more of the devices discussed with respect to the example computing environment 100, PPE 140, and/or PE 170 of FIGS. 1-4. For example, the SoCs 1004(A) and/or 1004(B) can be the same as, or similar to, the functional blocks 110*a*, 110*b* of FIG. 1.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LiDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs May include information such as vehicle velocity, speed, time, map data (e.g., the High Definition ("HD") map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1026 may also enable communication between objects in the environment (e.g., vehicles, mobile devices, etc.), using local area network(s), such as Bluetooth, Bluetooth Low Energy ("LE"), Z-Wave, ZigBcc, etc., and/or low power wide-area network(s) ("LPWANs"), such as LoRaWAN, SigFox, etc.

Figure 10B:
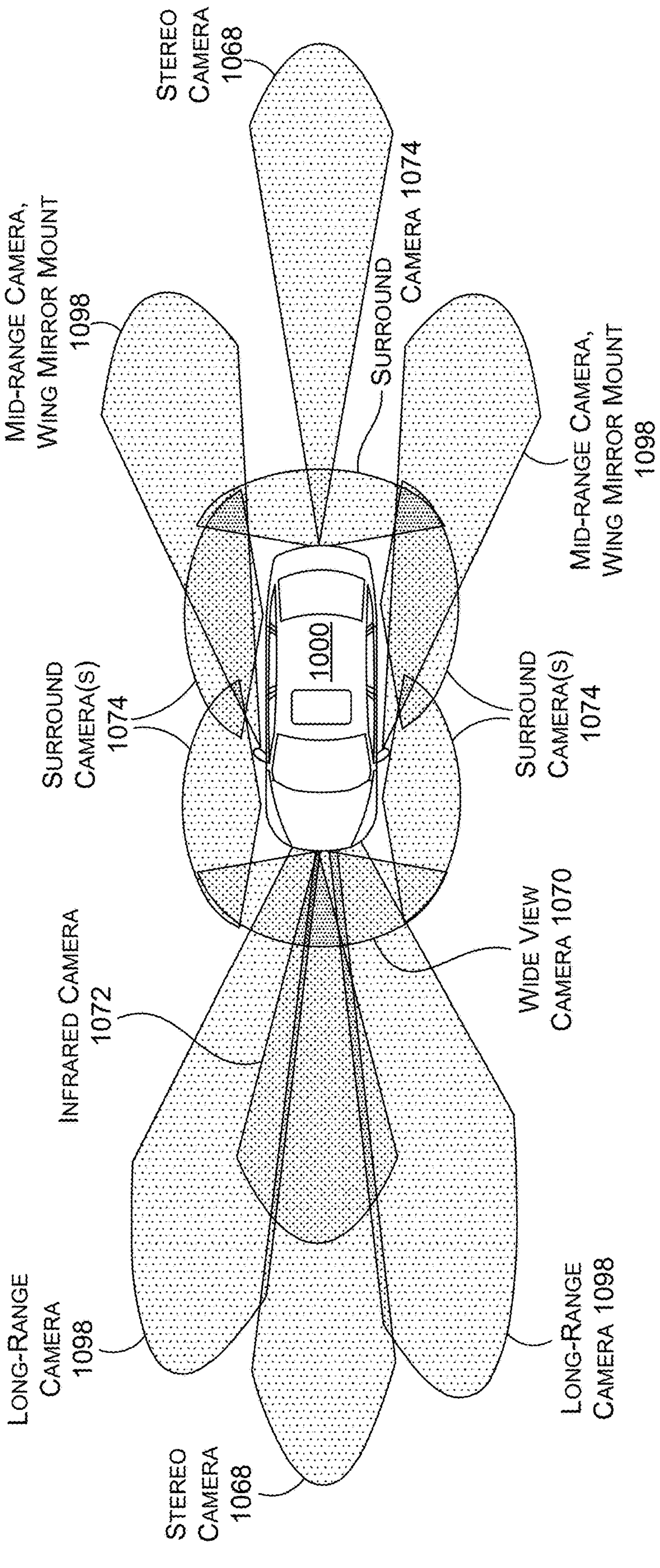
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may be any number (including zero) of wide-view cameras 1070 on the vehicle 1000. In addition, any number of long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

Any number of stereo cameras 1068 may also be included in a front-facing configuration. In at least one embodiment, one or more of stereo camera(s) 1068 may include an integrated control unit including a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
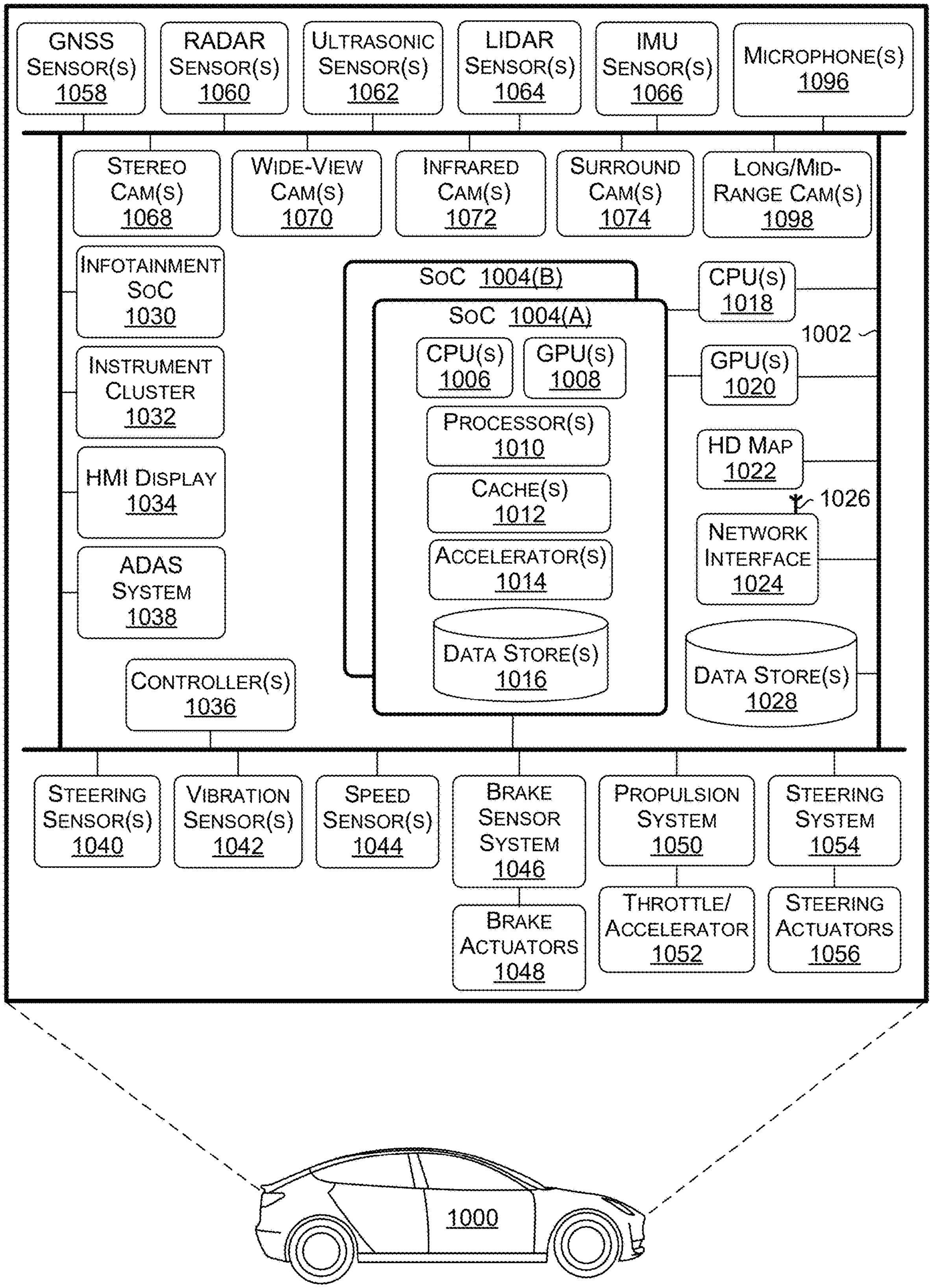
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, which may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LiDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may include L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LiDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, which use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 460 m (front) or 80 m (rear), and a field of view of up to 42 degrees (front) or 450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LiDAR sensor(s) 1064. The LiDAR sensor(s) 1064 may be used for object and pedestrian detection, emergency braking, collision avoidance, and/or other functions. The LiDAR sensor(s) 1064 may be functional safety level ASIL B. In some examples, the vehicle 1000 may include multiple LiDAR sensors 1064 (e.g., two, four, six, etc.) that may use Ethernet (e.g., to provide data to a Gigabit Ethernet switch).

In some examples, the LiDAR sensor(s) 1064 may be capable of providing a list of objects and their distances for a 360-degree field of view. Commercially available LiDAR sensor(s) 1064 may have an advertised range of approximately 400 m, with an accuracy of 2 cm-3 cm, and with support for a 400 Mbps Ethernet connection, for example. In some examples, one or more non-protruding LiDAR sensors 1064 may be used. In such examples, the LiDAR sensor(s) 1064 may be implemented as a small device that may be embedded into the front, rear, sides, and/or corners of the vehicle 1000. The LiDAR sensor(s) 1064, in such examples, may provide up to a 120-degree horizontal and 35-degree vertical field-of-view, with a 200 m range even for low-reflectivity objects. Front-mounted LiDAR sensor(s) 1064 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 1000. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LiDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, which is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, which is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, which is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, which is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may include and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
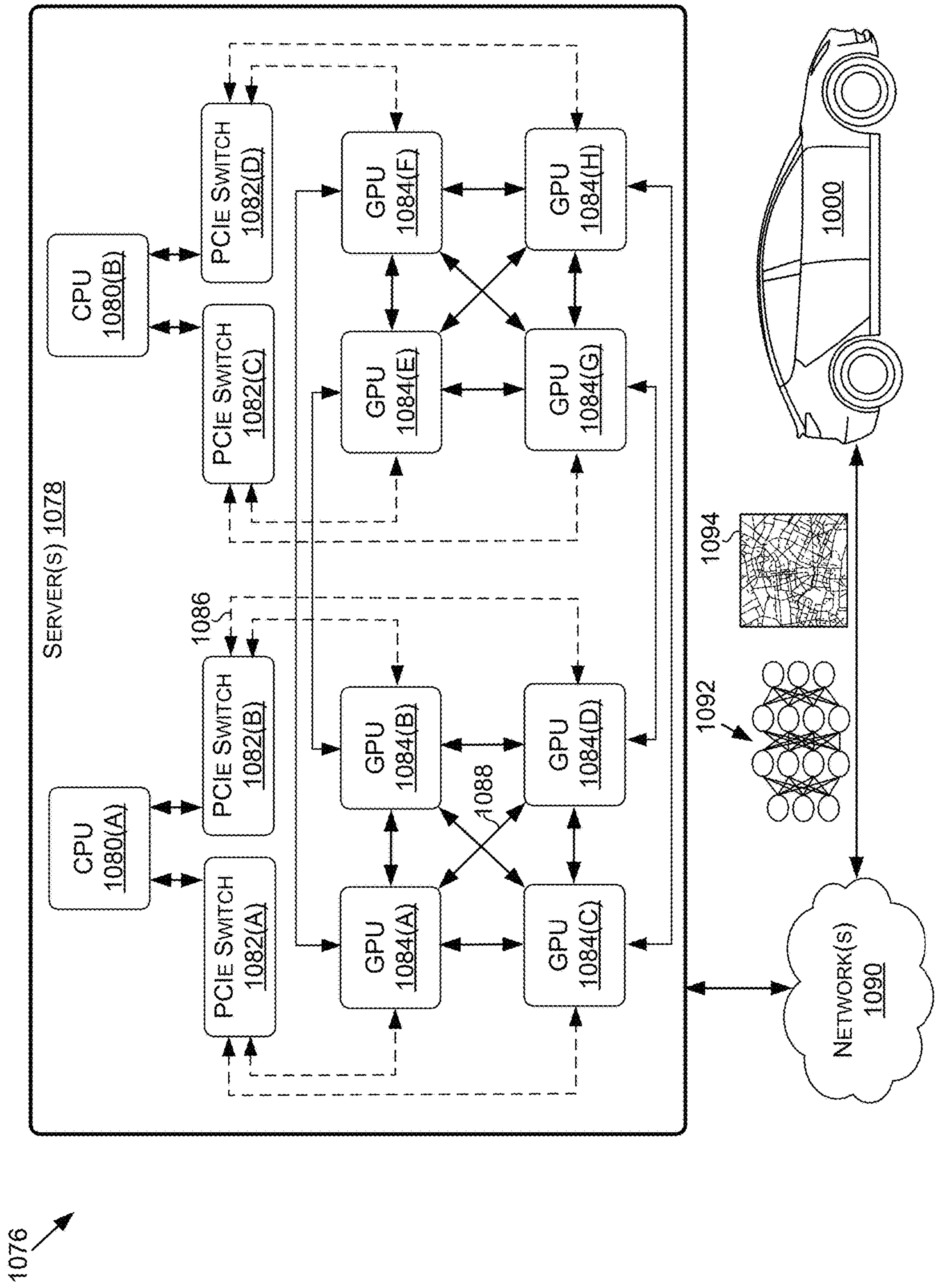
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Having now described some illustrative implementations, the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B' can include only 'A', only 'B', as well as both 'A' and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any clam elements.

Scope of the systems and methods described herein is thus indicated by the appended claims, rather than the foregoing description. The scope of the claims includes equivalents to the meaning and scope of the appended claims.

What is claimed is:

1. A system, comprising:

a memory device;

a first processor including a stream processor and a scheduling processor, the first processor coupled with the memory device;

a second processor coupled with the first processor;

one or more processors to:

configure, according to a first latency of the memory device, the stream processor to read from or write to the memory device at the first latency;

configure, according to a second latency of the second processor, the scheduling processor to read from or write to with one or more memory registers of the second processor at the second latency;

provide data between the first processor and the memory device at the first latency; and provide data between the second processor and the stream processor at the second latency.

2. The system of claim 1, wherein the one or more processors are to:

configure, according to the first latency of the memory device, a length of a buffer of the stream processor.

3. The system of claim 1, wherein the one or more processors are to:

provide, concurrently with the data between the first processor and the memory device at the first latency, the data between the second processor and the stream processor at the second latency.

4. The system of claim 1, wherein the stream processor is configured to provide an amount of data of the data during a cycle.

5. The system of claim 4, wherein the amount of data is based on at least one of a dimension of the memory device or a length of a buffer of the stream processor.

6. The system of claim 1, wherein the stream processor comprises a plurality of stream processors each respectively configured to perform at least one read operation or at least one write operation with the memory device.

7. The system of claim 1, wherein the stream processor is configured according to the first latency and based at least on one or more instructions generated by a compiler.

8. The system of claim 7, wherein the one or more instructions generated by the compiler instruct the stream processor to load the data from the memory device.

9. The system of claim 7, wherein the one or more instructions generated by the compiler instruct the stream processor to store the data to the memory device.

10. The system of claim 1, wherein the one or more processors are to:

provide, from the second processor to the first processor, an instruction to start configuration of the stream processor.

11. The system of claim 1, wherein the system is comprised in at least one of:

a control system for an autonomous or semi-autonomous machine;

a perception system for an autonomous or semi-autonomous machine;

a system implemented using a robot;

an aerial system;

a medical system;

a boating system;

a smart area monitoring system;

a system for performing deep learning operations;

a system for performing simulation operations;

a system for generating or presenting at least one of virtual reality (VR) content, augmented reality (AR) content, or mixed reality (MR) content;

a system for performing digital twin operations;

a system implemented using an edge device;

a system incorporating one or more virtual machines (VMs);

a system for generating synthetic data;

a system implemented at least partially in a data center;

a system for performing conversational artificial intelligence (AI) operations;

a system for performing generative AI operations;

a system implementing language models;

a system for implementing large language models (LLMs);

a system implementing vision language models (VLMs);

a system for implementing multi-modal language models;

a system for hosting one or more real-time streaming applications;

a system for performing light transport simulation;

a system for performing collaborative content creation for 3D assets; or a system implemented at least partially using cloud computing resources.

12. A method, comprising:

configuring, according to a first latency of a memory device, a stream processor of a first processor, the stream processor configured to read from or write to the memory device at the first latency;

configuring, according to a second latency of a second processor, a scheduling processor of the first processor, the scheduling processor configured to read from or write to one or more memory registers of the second processor at the second latency;

providing data between the first processor and the memory device at the first latency; and providing data between the second processor and the stream processor at the second latency.

13. The method of claim 12, further comprising:

configuring, according to the first latency of the memory device, a length of a buffer of the stream processor.

14. The method of claim 12, further comprising:

providing, concurrently with the data between the first processor and the memory device at the first latency, the data between the second processor and the stream processor at the second latency.

15. The method of claim 12, wherein the stream processor is configured to provide an amount of data of the data during a cycle.

16. The method of claim 15, wherein the amount of data is based on at least one of a dimension of the memory device or a length of a buffer of the stream processor.

17. The method of claim 16, wherein the stream processor comprises a plurality of stream processors each respectively configured to perform at least one read operation or at least one write operation with the memory device.

18. The method of claim 12, wherein the stream processor is configured according to the first latency and based at least on one or more instructions generated by a compiler.

19. A system-on-a-chip (SoC), comprising:

at least one graphics processing unit (GPU) providing multi-core parallel processing via a plurality of respective lanes, the GPU to:

configure a first processor to read from or write to a memory device at a first latency of the memory device;

configure the first processor to read from or write to one or more memory registers of a second processor at a second latency of the second processor;

provide data between the first processor and the memory device at the first latency; and provide data between the second processor and the first processor at the second latency.

20. The SoC of claim 19, including one or more instructions executable by the GPU to:

configure, according to the first latency of the memory device, a length of a buffer of the first processor.

* * * * *